US012080285B2

(12) United States Patent
Baror et al.

(10) Patent No.: US 12,080,285 B2
(45) Date of Patent: Sep. 3, 2024

(54) SEMI-DELEGATED CALLING BY AN AUTOMATED ASSISTANT ON BEHALF OF HUMAN PARTICIPANT

(71) Applicant: Google LLC, Mountain View, CA (US)

(72) Inventors: Yuval Baror, Mountain View, CA (US); Yaniv Leviathan, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 690 days.

(21) Appl. No.: 16/973,597

(22) PCT Filed: Apr. 22, 2020

(86) PCT No.: PCT/US2020/029346
§ 371 (c)(1),
(2) Date: Dec. 9, 2020

(87) PCT Pub. No.: WO2021/188126
PCT Pub. Date: Sep. 23, 2021

(65) Prior Publication Data
US 2022/0051664 A1 Feb. 17, 2022

Related U.S. Application Data

(60) Provisional application No. 62/992,609, filed on Mar. 20, 2020.

(51) Int. Cl.
*G10L 15/22* (2006.01)
*G06F 3/0482* (2013.01)
(Continued)

(52) U.S. Cl.
CPC ............ *G10L 15/22* (2013.01); *G06F 3/0482* (2013.01); *G10L 13/047* (2013.01); *H04L 67/306* (2013.01); *H04M 3/4936* (2013.01)

(58) Field of Classification Search
CPC ...... G10L 15/22; G10L 13/047; G06F 3/0482; H04L 67/306; H04M 3/4936
See application file for complete search history.

(56) References Cited

U.S. PATENT DOCUMENTS 5,815,566 A  9/1998  Ramot et al.
6,304,653 B1  10/2001  O'Neil et al.
(Continued)

FOREIGN PATENT DOCUMENTS

CN  103795877  5/2014
CN  105592237  5/2016
(Continued)

OTHER PUBLICATIONS

Leviathan, Yaniv, and Yossi Matias, "Google Duplex: An AI System for Accomplishing Real-World Tasks Over the Phone", May 2018, Google AI blog. (Year: 2018).*

(Continued)

*Primary Examiner* — Daniel C Washburn
*Assistant Examiner* — James Boggs
(74) *Attorney, Agent, or Firm* — Gray Ice Higdon

(57) ABSTRACT

Implementations are directed to using an automated assistant to initiate an assisted call on behalf of a given user. The assistant can, during the assisted call, receiving a request, from an additional user on the assisted call, for information that is not known to the assistant. In response, the assistant can render a prompt for the information and, while awaiting responsive input from the given user, continue the assisted call using already resolved value(s) for the assisted call. If responsive input is received within a threshold duration of time, synthesized speech, corresponding to the responsive input, is rendered as part of the assisted call. Implementations are additionally or alternatively directed to using the automated assistant to provide, during an ongoing call (Continued)

between a given user and an additional user, output that is based on a value requested by the additional user during the ongoing call.

19 Claims, 11 Drawing Sheets

(51) Int. Cl.
    *G10L 13/047* (2013.01)
    *H04L 67/306* (2022.01)
    *H04M 3/493* (2006.01)

(56) References Cited

U.S. PATENT DOCUMENTS

| | | | |
|---|---|---|---|
| 6,377,567 | B1 | 4/2002 | Leonard |
| 6,731,725 | B1 | 5/2004 | Merwin et al. |
| 6,922,465 | B1 | 7/2005 | Howe |
| 7,084,758 | B1 | 8/2006 | Cole |
| 7,337,158 | B2 | 2/2008 | Fratkina et al. |
| 7,539,656 | B2 | 5/2009 | Fratkina et al. |
| 7,792,773 | B2 | 9/2010 | McCord et al. |
| 7,920,678 | B2 | 4/2011 | Cooper et al. |
| 8,345,835 | B1 | 1/2013 | Or-Bach et al. |
| 8,594,308 | B2 | 11/2013 | Soundar |
| 8,938,058 | B2 | 1/2015 | Soundar |
| 8,964,963 | B2 | 2/2015 | Soundar |
| 9,232,369 | B1 | 1/2016 | Fujisaki |
| 9,318,108 | B2 | 4/2016 | Gruber et al. |
| 9,430,570 | B2 * | 8/2016 | Button ............... G06F 16/9535 |
| 9,467,566 | B2 | 10/2016 | Soundar |
| 9,473,637 | B1 | 10/2016 | Venkatapathy et al. |
| 10,134,395 | B2 * | 11/2018 | Typrin .................. G10L 15/22 |
| 10,318,096 | B2 * | 6/2019 | Bhardwaj ............. G06F 3/0481 |
| 10,425,533 | B1 | 9/2019 | Mossoba et al. |
| 10,498,904 | B1 * | 12/2019 | Sandler ............... H04M 3/4936 |
| 10,567,579 | B2 * | 2/2020 | Tichauer ............. H04M 3/4936 |
| 10,645,216 | B1 * | 5/2020 | Hart .................... H04M 3/4936 |
| 11,005,988 | B1 * | 5/2021 | Patakokila .......... H04M 3/4286 |
| 11,056,110 | B2 * | 7/2021 | Kim ................... G10L 15/1822 |
| 11,134,034 | B2 * | 9/2021 | Goslin .................... H04L 51/02 |
| 2002/0051522 | A1 | 5/2002 | Merrow et al. |
| 2002/0055975 | A1 | 5/2002 | Petrovykh |
| 2003/0009530 | A1 | 1/2003 | Philonenko |
| 2003/0063732 | A1 | 4/2003 | Mcknight |
| 2004/0001575 | A1 | 1/2004 | Tang |
| 2004/0083195 | A1 | 4/2004 | McCord et al. |
| 2004/0213384 | A1 | 10/2004 | Alles et al. |
| 2004/0240642 | A1 | 12/2004 | Crandell et al. |
| 2005/0147227 | A1 | 7/2005 | Chervirala et al. |
| 2005/0175168 | A1 | 8/2005 | Summe et al. |
| 2005/0271250 | A1 | 12/2005 | Vallone et al. |
| 2006/0039365 | A1 | 2/2006 | Ravikumar et al. |
| 2006/0056600 | A1 | 3/2006 | Merrow et al. |
| 2006/0215824 | A1 | 9/2006 | Mitby et al. |
| 2007/0036320 | A1 | 2/2007 | Mandalia et al. |
| 2007/0201664 | A1 | 8/2007 | Salafia |
| 2008/0181371 | A1 | 7/2008 | Merrow et al. |
| 2008/0209449 | A1 | 8/2008 | Maehira |
| 2008/0309449 | A1 | 12/2008 | Martin et al. |
| 2009/0022293 | A1 | 1/2009 | Routt |
| 2009/0029674 | A1 | 1/2009 | Brezina et al. |
| 2009/0089096 | A1 | 4/2009 | Schoenberg |
| 2009/0089100 | A1 | 4/2009 | Nenov et al. |
| 2009/0137278 | A1 | 5/2009 | Haru et al. |
| 2009/0232295 | A1 | 9/2009 | Ryskamp |
| 2010/0088613 | A1 | 4/2010 | DeLuca et al. |
| 2010/0104087 | A1 | 4/2010 | Byrd et al. |
| 2010/0124325 | A1 | 5/2010 | Weng et al. |
| 2010/0228590 | A1 | 9/2010 | Muller et al. |
| 2011/0092187 | A1 | 4/2011 | Miller |
| 2011/0270687 | A1 | 11/2011 | Bazaz |
| 2012/0016678 | A1 | 1/2012 | Gruber et al. |
| 2012/0109759 | A1 | 5/2012 | Oren et al. |
| 2012/0147762 | A1 | 6/2012 | Hancock et al. |
| 2012/0157067 | A1 | 6/2012 | Turner et al. |
| 2012/0173243 | A1 | 7/2012 | Anand et al. |
| 2012/0271676 | A1 | 10/2012 | Aravamudan et al. |
| 2013/0060587 | A1 | 3/2013 | Bayrak et al. |
| 2013/0077772 | A1 | 3/2013 | Lichorowic et al. |
| 2013/0090098 | A1 | 4/2013 | Gidwani |
| 2013/0136248 | A1 | 5/2013 | Kaiser-Nyman et al. |
| 2013/0163741 | A1 | 6/2013 | Balasaygun et al. |
| 2013/0275164 | A1 | 10/2013 | Gruber et al. |
| 2014/0024362 | A1 | 1/2014 | Kang et al. |
| 2014/0029734 | A1 | 1/2014 | Kim et al. |
| 2014/0037084 | A1 | 2/2014 | Dutta |
| 2014/0107476 | A1 | 4/2014 | Tung et al. |
| 2014/0122077 | A1 | 5/2014 | Nishikawa et al. |
| 2014/0122618 | A1 | 5/2014 | Duan |
| 2014/0200928 | A1 | 7/2014 | Watanabe et al. |
| 2014/0207882 | A1 | 7/2014 | Joo et al. |
| 2014/0247933 | A1 | 9/2014 | Soundar |
| 2014/0279050 | A1 | 9/2014 | Makar et al. |
| 2014/0280464 | A1 | 9/2014 | De Ding et al. |
| 2014/0310365 | A1 | 10/2014 | Sample et al. |
| 2015/0139413 | A1 | 5/2015 | Hewitt et al. |
| 2015/0142704 | A1 | 5/2015 | London |
| 2015/0150019 | A1 | 5/2015 | Sheaffer et al. |
| 2015/0237203 | A1 | 8/2015 | Siminoff |
| 2015/0248817 | A1 | 9/2015 | Steir et al. |
| 2015/0281446 | A1 | 10/2015 | Milstein et al. |
| 2015/0339707 | A1 | 11/2015 | Harrison et al. |
| 2015/0347399 | A1 | 12/2015 | Aue et al. |
| 2015/0350331 | A1 | 12/2015 | Kumar |
| 2015/0358790 | A1 | 12/2015 | Nasserbakht |
| 2016/0028891 | A1 | 1/2016 | Pirat et al. |
| 2016/0105546 | A1 | 4/2016 | Keys et al. |
| 2016/0139998 | A1 | 5/2016 | Dunn et al. |
| 2016/0198045 | A1 | 7/2016 | Kulkarni et al. |
| 2016/0227033 | A1 | 8/2016 | Song |
| 2016/0227034 | A1 | 8/2016 | Kulkarni et al. |
| 2016/0277569 | A1 | 9/2016 | Shine et al. |
| 2016/0379230 | A1 | 12/2016 | Chen |
| 2017/0037084 | A1 | 2/2017 | Fasan |
| 2017/0039194 | A1 | 2/2017 | Tschetter |
| 2017/0061091 | A1 | 3/2017 | McElhinney et al. |
| 2017/0094052 | A1 | 3/2017 | Zhang et al. |
| 2017/0177298 | A1 | 6/2017 | Hardee et al. |
| 2017/0180499 | A1 | 6/2017 | Gelfenbeyn et al. |
| 2017/0289332 | A1 | 10/2017 | Lavian et al. |
| 2017/0358296 | A1 * | 12/2017 | Segalis ............. H04M 3/42042 |
| 2017/0359463 | A1 | 12/2017 | Segalis et al. |
| 2017/0359464 | A1 * | 12/2017 | Segalis .................... H04M 3/58 |
| 2017/0365277 | A1 | 12/2017 | Park |
| 2018/0124255 | A1 | 5/2018 | Kawamura et al. |
| 2018/0133900 | A1 | 5/2018 | Breazeal et al. |
| 2018/0220000 | A1 | 8/2018 | Segalis et al. |
| 2018/0227416 | A1 | 8/2018 | Segalis et al. |
| 2018/0227417 | A1 | 8/2018 | Segalis et al. |
| 2018/0227418 | A1 | 8/2018 | Segalis et al. |
| 2018/0322880 | A1 * | 11/2018 | Vuskovic ................ G06F 40/35 |
| 2018/0336449 | A1 | 11/2018 | Adan et al. |
| 2018/0342241 | A1 | 11/2018 | Qu |
| 2019/0281159 | A1 | 9/2019 | Segalis et al. |
| 2019/0303804 | A1 * | 10/2019 | Bright .................... G06Q 10/02 |
| 2019/0306314 | A1 | 10/2019 | Segalis et al. |
| 2020/0042597 | A1 | 2/2020 | Wu |

FOREIGN PATENT DOCUMENTS

| | | |
|---|---|---|
| CN | 106503646 | 3/2017 |
| EP | 1679693 | 7/2006 |
| EP | 3618062 | 3/2020 |
| JP | 2004508748 | 3/2004 |
| JP | 2007219385 | 8/2007 |
| JP | 2007524928 | 8/2007 |
| JP | 2008015439 | 1/2008 |
| JP | 2009210703 | 9/2009 |
| JP | 2015070371 | 2/2015 |
| JP | 2018101847 | 6/2018 |
| JP | 2019522914 | 8/2019 |
| JP | 2020034914 | 3/2020 |
| KR | 20130099423 | 9/2013 |

(56) References Cited

FOREIGN PATENT DOCUMENTS

| KR | 20140121105 | 10/2014 |
|----|-------------|---------|
| KR | 20200024511 | 3/2020 |
| WO | 2007065193 | 6/2007 |

OTHER PUBLICATIONS

Davies, Ruxandra, and Scott Davies, "Automatic Context Determination for Answering User Queries", Feb. 2019, Technical Disclosure Commons, pp. 1-8. (Year: 2019).*

Pradhan, Swadhin, Lili Qiu, Abhinav Parate, and Kyu-Han Kim, "Understanding and Managing Notifications", May 2017, IEEE Infocom 2017—IEEE Conference on Computer Communications, pp. 1-9. (Year: 2017).*

Mehrotra, Abhinav, Mirco Musolesi, Robert Hendley, and Veljko Pejovic, "Designing Content-driven Intelligent Notification Mechanisms for Mobile Applications", Sep. 2015, Proceedings of the 2015 ACM International Joint Conference on Pervasive and Ubiquitous Computing (UBICOMP '15), pp. 813-824. (Year: 2015).*

Koetsier, John, "Google Duplex Uses AI and Natural Language to Make Phone Calls for You, Saving You Hours", May 8, 2018, Forbes, https://www.forbes.com/sites/johnkoetsier/2018/05/08/googles-amazing-new-ai-driven-real-voice-phone-tech-will-save-humans-millions-of-hours. (Year: 2018).*

European Patent Office; Invitation to Pay Additional Fees; Ser. No. PCT/US2020/029346; 14 pages; dated Nov. 18, 2020.

European Patent Office; International Search Report and Written Opinion of PCT Ser. No. PCT/US2020/029346; 18 pages; dated Jan. 18, 2021.

Intellectual Property India, First Examination Report issued in Application 202227017134; 7 pages; dated Nov. 1, 2022.

Europen Patent Office; Communication pursuant to Article 94(3) EPC issued in Application No. 20725347.7; 5 pages; dated Dec. 20, 2022.

Japanese Patent Office; Notice of Reasons for Rejection issued in Application No. 2022-520917; 13 pages; dated May 29, 2023.

The Korean Intellectual Property Office; Notice of Office Action issued in Application No. 10-2022-7021946; 6 pages; dated Jul. 30, 2023.

Patent Office; Intention to Grant issued in Application No. 20725347.7; 92 pages; dated Dec. 18, 2023.

* cited by examiner

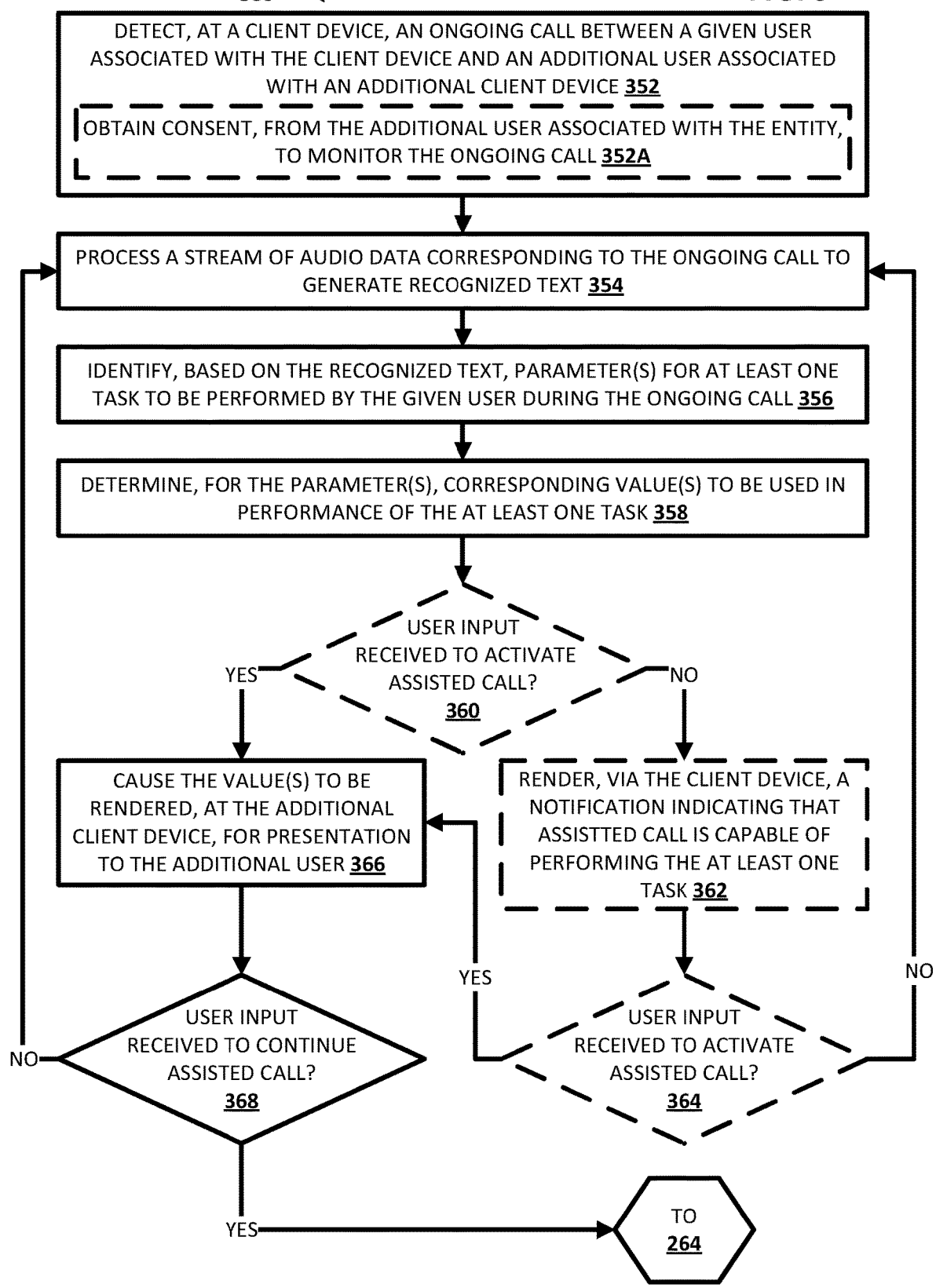

SEMI-DELEGATED CALLING BY AN AUTOMATED ASSISTANT ON BEHALF OF HUMAN PARTICIPANT

BACKGROUND

Automated assistants can be interacted with by a user via a variety of computing devices, such as smart phones, tablet computers, wearable devices, automobile systems, stand-alone personal assistant devices, and so forth. The automated assistants receive input from the user (e.g., spoken, touch, and/or typed) and respond with responsive output (e.g., visual and/or audible).

A user can interact with an automated assistant to cause the automated assistant to perform action(s) on behalf of the user. As one example, the automated assistant can place telephone calls on behalf of the user to perform a given action, and can engage in a dialog with an additional user to perform the action(s). For instance, a user can provide user input that requests the automated assistant make a restaurant reservation over the phone and on behalf of the user. The automated assistant can initiate a telephone call with a particular restaurant, and can provide reservation information to an additional user associated with the particular restaurant to make the reservation. The automated assistant can then notify the user whether the restaurant reservation was successfully made on behalf of the user.

However, for some action(s) performed by the automated assistant on behalf of the user, the automated assistant may not know enough information to fully perform the action(s). As one example, assume the automated assistant making the restaurant reservation over the phone and on behalf of the user described above, and further assume the additional user associated with the particular restaurant requests information that is not known to the automated assistant. Some automated assistants can determine that the requested information is not known, and provide a notification to the user that requests the user to actively join the call to complete the restaurant reservation. However, waiting for the user to actively join the call can prolong the call and prolong associated usage of computational and/or network resources used during the call. Additionally or alternatively, the user may not be available to join the call. This can lead to failure of the call, and require the automated assistant and/or the user to perform the action(s) at a later time, thereby consuming more computational and/or network resources than if the action(s) were performed successfully by the automated assistant during the initial call.

SUMMARY

Some implementations are directed to using an automated assistant to perform an assisted call, with an entity, to perform task(s) on behalf of a given user. The assisted call is between the automated assistant and an additional user associated with the entity. The automated assistant can perform the assisted call using resolved value(s) for parameter(s) that are associated with the task(s) and/or the entity. Performing the assisted call can include audibly rendering, by the automated assistant and in the assisted call, instance(s) of synthesized speech that are audibly perceptible to the additional user. Rendering an instance of synthesized speech in the assisted call can include injecting the synthesized speech into the assisted call such that it is audibly perceptible to the additional user (but not necessarily the given user). The instance(s) of synthesized speech can each be generated based on one or more of the resolved value(s) and/or can be generated to be responsive to utterance(s), of the additional user, during the assisted call. Performing the assisted call can also include performing, by the automated assistant, automatic speech recognition of audio data of the assisted call that captures utterance(s), of the additional user, to generate recognized text of the utterance(s), and using the recognized text in determining instance(s) of synthesized speech, that are responsive to the utterance(s), for rendering in the assisted call.

Some of those implementations are further directed to determining, during performing of the assisted call, that utterance(s) of the additional user include a request for information associated with an additional parameter, and that no value(s) are automatically determinable for the additional parameter. In response, the automated assistant can cause an audio and/or visual notification (e.g., a prompt) to be rendered to the given user, where the notification requests further user input related to resolving value(s) for the additional parameter. In some implementations, the notification can be rendered outside of the ongoing call (i.e., not injected as part of the ongoing call), but be perceivable to the given user, to enable the given user to ascertain the value and convey the value in the ongoing call. Prior to receiving any further user input that is responsive to the notification, the automated assistant can continue the assisted call. For example, the automated assistant can, without awaiting for further user input that is responsive to the notification, proactively provide, during the call, instance(s) of synthesized speech that are based on already resolved value(s) that have not yet been conveyed in prior instance(s) of synthesized speech. If further user input is provided responsive to the notification and value(s) for the additional parameter are resolvable based on the further user input, the automated assistant can, after continuing the assisted call, provide further synthesized speech that conveys the resolved value(s) for the additional parameter. By continuing the assisted call without awaiting further user input responsive to the notification, value(s) necessary for completing the task can be conveyed during the assisted call while awaiting the additional value(s) for the additional parameter, and the additional value(s) can be later provided (if received). In these and other manners, the assisted call can conclude more quickly, thereby lessening the overall duration that computer and/or network resources are utilized in performing the assisted call.

In some implementations that render a notification that requests further user input related to resolving value(s) for the additional parameter, the notification, and/or one or more properties for rendering the notification, can be dynamically determined based on a state of the assisted call and/or a state of the client device being used in the assisted call. For example, if the state of the client device indicates that the given user is actively monitoring the assisted call, the notification can be a visual-only notification and/or can include an audible component at a lower volume. On the other hand, if the state of the client device indicates that the given user is not actively monitoring the assisted call, the notification can include at least an audible component and/or the audible component can be rendered at a higher volume. The state of the client device can be based on, for example, sensor data from sensor(s) of the client device (e.g., gyroscope(s), accelerometer(s), presence sensor(s), and/or other sensor(s)) and/or sensor(s) of other client device(s) associated with the user. As yet another example, if the state of the assisted call indicates that multiple resolved value(s) have yet to be conveyed at a time of providing the notification, the notification can be a visual-only notification and/or can include an audible component at a lower volume. On the other hand, if the state of the assisted call indicates that only one (or none) resolved value(s) have yet to be conveyed at the time of providing the notification, the notification can include at least an audible component and/or the audible component can be rendered at a higher volume. More generally, implementations can seek to provide a more intrusive notification when the state of the client device indicates the user is not actively monitoring the call and/or when the state of the conversation indicates that a duration of meaningfully continuing the conversation is relatively short. On the other hand, implementations can seek to provide a less intrusive notification when the state of the client device indicates the user is actively monitoring the call and/or when the state of the conversation indicates that a duration of meaningfully continuing the conversation is relatively long. Although the more intrusive notification can be more resource intensive to render, implementations can still selectively render the more intrusive notification to seek to balance the increased resources to render the more intrusive notification with the increased resources that would be required to unduly prolong the assisted call and/or end the assisted call without completion of the task.

Some implementations are additionally or alternatively directed to using the automated assistant to provide, during an ongoing call between a given user and an additional user, output that is based on a value requested by the additional user during the ongoing call. The output can be provided proactively and can prevent the given user from launching and/or navigating within application(s) to independently seek the value. For example, assume that the given user is engaged in an ongoing call with a utilities company representative, and further assume that the utilities company representative requests address information of the given user and an account number associated with the utilities company. In this example, the given user may provide the address information, but may not know the account number for the utilities company without searching through received emails or messages from the utilities company, searching through a website associated with the utilities company, and/or performing other computing device interactions to locate the account number associated with the utilities company. However, by using the techniques described herein, the automated assistant can easily identify the account number associated with the utilities company independent of any user input, from the given user, requesting the automated assistant identify the account number, and can provide the account number to the given user and/or the additional user visually and/or audibly during the ongoing call in response to identifying that the utilities company representative has requested the account number.

In these and other manners, client device resource(s) can be preserved by preventing the launching and/or interaction with such application(s). Further, the value indicated by the proactively provided output can be conveyed more quickly in the given call than if the user had to independently seek the value, thereby shortening the overall duration of the ongoing call. In various implementations, the automated assistant can process a stream of audio data, that captures at least one spoken utterance during the ongoing call, to generate recognized text, where the at least one spoken utterance is of the given user or the additional user. Further, the automated assistant can identify, based on processing the recognized text, that the at least one spoken utterance requests information for a parameter and determine, for the parameter and using access-restricted data that is personal to the given user, that a value, for the parameter, is resolvable.

The output can be rendered in response to determining that the value is resolvable. In some implementations, the output can be rendered outside of the ongoing call (i.e., not injected as part of the ongoing call), but be perceivable to the given user, to enable the given user to ascertain the value and convey the value in the ongoing call. In some additional or alternative implementations, the output can be rendered as synthesized speech as part of the ongoing call. For example, the synthesized speech can be rendered within the ongoing call automatically or upon receiving affirmative user interface input from the given user. In some implementations that provide, during an ongoing call between a given user and an additional user, output that is based on a value requested by the additional user during the ongoing call, the output is only provided responsive to determining that no spoken input is provided, during the ongoing call, by the given user, and within a threshold amount of time, that includes the value. In these and other manners, instances of unnecessarily rendering the output can be mitigated.

The above description is provided as an overview of only some implementations disclosed herein. Those implementations, and other implementations, are described in additional detail herein.

BRIEF DESCRIPTION OF THE DRAWINGS

FIG. 3 depicts a flowchart illustrating an example method of providing assistive output during an ongoing non-assisted call, in accordance with various implementations.

DETAILED DESCRIPTION

Figure 1:
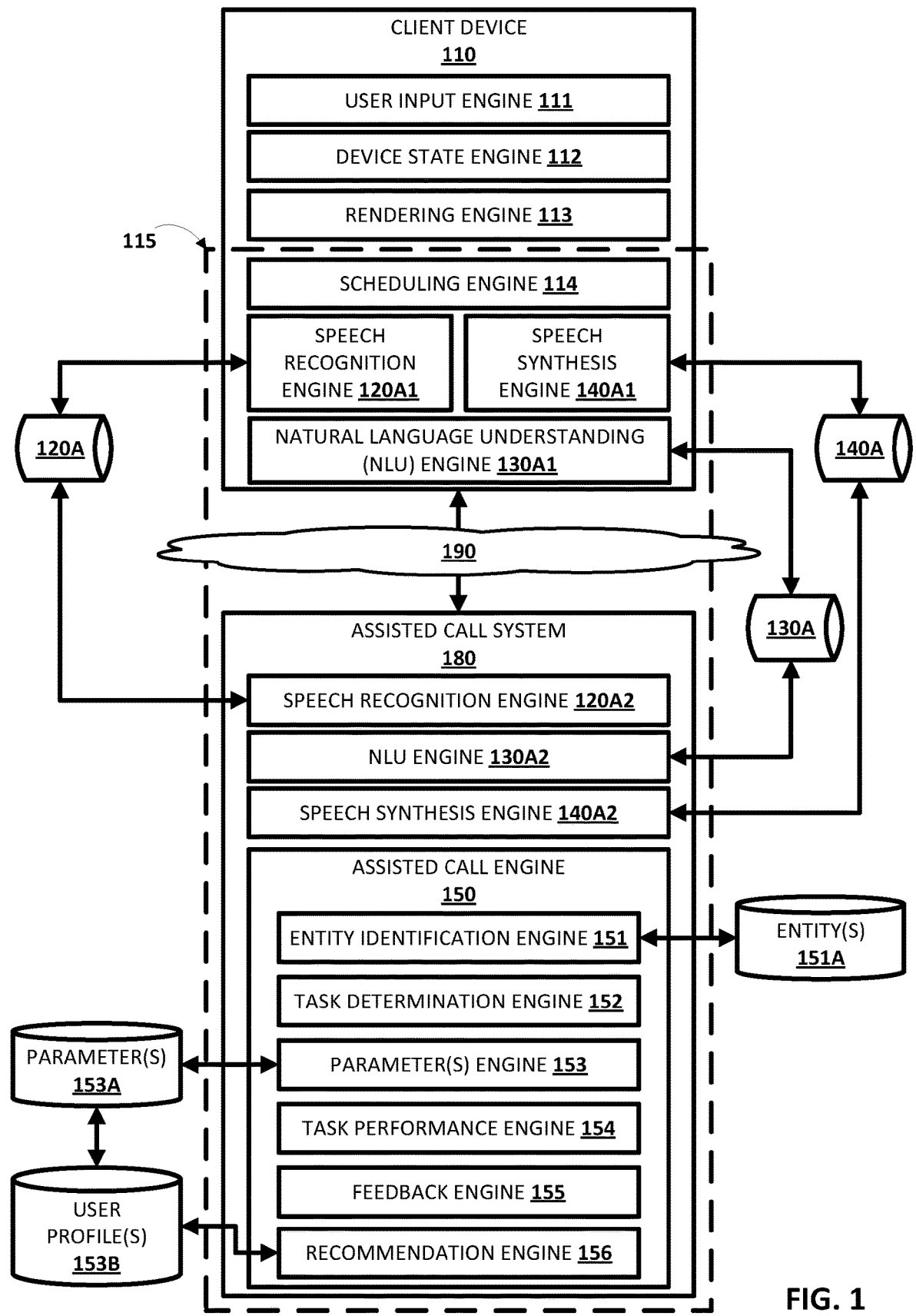
FIG. 1 depicts a block diagram of an example environment that demonstrates various aspects of the present disclosure, and in which implementations disclosed herein can be implemented.

FIG. 1 illustrates a block diagram of an example environment that demonstrates various aspects of the present disclosure. A client device 110 is illustrated in FIG. 1, and includes, in various implementations, user input engine 111, device state engine 112, rendering engine 113, scheduling engine 114, speech recognition engine 120A1, natural language understanding ("NLU") engine 130A1, and speech synthesis engine 140A1.

The user input engine 111 can detect various types of user input at the client device 110. The user input detected at the client device 110 can include spoken input detected via microphone(s) of the client device 110 and/or additional spoken input transmitted to the client device 110 from an additional client device of an additional user (e.g., during an assisted call and/or during other ongoing calls when assisted call is not already invoked), touch input detected via a user interface input device (e.g., touchscreen) of the client device 110, and/or typed input detected via a user interface input device (e.g., via a virtual keyboard on a touchscreen) of the client device 110. The additional user associated with an entity during an ongoing call (assisted or non-assisted) with the entity can be, for example, a human, an additional human participant associated with an additional client device, an additional automated assistant associated with the additional client device of the additional user, and/or other additional users.

The assisted calls and/or ongoing calls described herein can be performed using various voice communication protocols (e.g., Voice over Internet Protocol (VoIP), public switched telephone network (PSTN), and/or other telephonic communication protocols). As described herein, synthesized speech can be rendered as part of an assisted call and/or ongoing call, which can include injecting the synthesized speech into the call so that it is perceivable by at least one of the participants of the ongoing call and forms part of the audio data of the ongoing call. The synthesized speech can be generated and/or injected by a client device that is one of the endpoints of the call and/or can be generated and/or injected by a server that is in communication with the client device, and is also connected to the call. As also described herein, audible output can also be rendered outside of the assisted call, which does not include injecting the audible output into the call, although the output could be detected by a microphone of a client device connected to the call and, as a result, perceivable on the call. In some implementations, the call can optionally be muted and/or filtering can be used to mitigate perceiving, in the call, of audible output rendered outside the call.

In various implementations, automated assistant 115 (generally indicated by dashed lines in FIG. 1) can execute an assisted call at the client device 110 over network(s) 190 (e.g., Wi-Fi®, Bluetooth®, near-field communication, local area network(s), wide area network(s), and/or other networks) using assisted call system 180. The assisted call system 180 includes, in various implementations, speech recognition engine 120A2, NLU engine 130A2, speech synthesis engine 140A2, and assisted call engine 150. The automated assistant 115 can utilize the assisted call system 180 to perform task(s), on behalf of the given user of the client device 110, during a telephonic call with an additional user.

Moreover, in some implementations, prior to performing any task(s) on behalf of a given user of the client device 110, the automated assistant 115 can obtain consent from an additional user to engage in a dialog with the automated assistant 115. For example, the automated assistant 115 can obtain consent upon initiating the assisted call and prior to performance the task(s). As another example, the automated assistant 115 can obtain consent upon a given user of the client device 110 upon the given user initiating an ongoing call, even though the ongoing call is not initiated by the automated assistant 115. If the automated assistant 115 obtains consent from the additional user associated, then the automated assistant 115 can perform the task(s) using the assisted call system 180. However, if the automated assistant 115 does not obtain consent from the additional user, then the automated assistant 115 can cause the client device 110 to render a notification to the given user of the client device 110 (e.g., using rendering engine 113) indicating that the given user is needed to perform the task and/or end the call and render a notification to the given user of the client device 110 (e.g., using rendering engine 113) indicating that the task(s) was not performed.

As described in greater detail below, the automated assistant 115 can execute an assisted call using the assisted call system 180 in response to detecting user input, from a given user of the client device 110, to initiate a call using assisted call and/or during an ongoing call (i.e., when assisted call is not already invoked). In some implementations, the automated assistant 115 can determine value(s) for candidate parameter(s) to be used in performing task(s), on behalf of the given user of the client device 110, during the assisted call and/or during the ongoing call. In some versions of those implementations, the automated assistant 115 can engage in a dialog with the given user of the client device 110 to solicit the value(s) for the candidate parameter(s) prior to and/or during the assisted call. In some additional and/or alternative versions of those implementations, the automated assistant 115 can determine value(s) for candidate parameter(s) based on user profile(s) associated with the given user of the client device 110, and without soliciting the value(s) for the candidate parameter(s) prior to and/or during the assisted call. In some versions of those implementations, the automated assistant 115 can implement the assisted call using the assisted call system 180 automatically based on the dialog of an ongoing call, and without detecting any user input from the given user of the client device 110 via the user input engine 111.

As shown in FIG. 1, the assisted call system 180 can be implemented remotely (e.g., via server(s) and/or other remote client device(s)). Although the assisted call system 180 is shown in FIG. 1 as being implemented remotely over the network(s) 190, it should be understood that that is for sake of example and is not meant to be limiting. For example, in various implementations, the assisted call system 180 can be implemented locally on the client device 110. Moreover, although the automated assistant 115 is shown in FIG. 1 as being implemented both locally on the client device 110 and remotely at the assisted call system 180, it should be understood that is also for the sake of example and is not meant to be limiting. For example, in various implementations, the automated assistant 115 can be implemented locally on the client device 110, or locally on the client device 110 and interact with a separate, cloud-based automated assistant.

In implementations when the user input engine 111 detects spoken input of a given user via microphone(s) of the client device 110 and/or receives audio data capturing additional spoken input, from an additional user, transmitted to the client device 110 from an additional client device (e.g., during an assisted call and/or during an ongoing call), the speech recognition engine 120A1 of the client device 110 can process, using speech recognition model(s) 120A, the audio data that captures the spoken input and/or that captures the additional spoken input to generate recognized text corresponding to the spoken input and/or the additional spoken input. Further, the NLU engine 130A1 of the client device 110 can process, using NLU model(s) 130A, the recognized text generated by the speech recognition engine 120A1 to determine intent(s) included in the spoken input and/or the additional spoken input. For example, if the client device 110 detects spoken input of "call Example Café to make a reservation for tonight" from the given user, the client device 110 can process, using the speech recognition model(s) 120A, audio data that captures the spoken input to generate recognized text corresponding to the spoken input of "call Example Café to make a reservation for tonight", and can process, using the NLU model(s) 130A, the recognized text to determine at least a first intent of initiating a call and a second intent of making a restaurant reservation. As another example, if the client device 110 detects additional spoken input of "will any children be joining the reservation?", then the client device 110 can process, using the speech recognition model(s) 120A, audio data that captures the additional spoken input to generate recognized text corresponding to the additional spoken input of "will any children be joining the reservation?", and can process, using the NLU model(s) 130A, the recognized text to determine an intent of a request for information associated with additional parameter(s) as described herein. In some versions of those implementations, the client device 110 can transmit the audio data, the recognized text, and/or the intent(s) to the assisted call system 180.

In other implementations when the user input engine 111 detects spoken input of a given user via microphone(s) of the client device 110 and/or audio data capturing additional spoken input, from an additional user, transmitted to the client device 110 from an additional client device (e.g., during an assisted call and/or during an ongoing call), the automated assistant 115 can cause the client device 110 to transmit audio data that captures the spoken input and/or the audio data that captures the additional use input to assisted call system 180. The speech recognition engine 120A2 and/or the NLU engine 130A2 of the assisted call system 180 can process the audio data that captures the spoken input and/or the audio data that captures the additional spoken utterance in similar manner described above with respect to the speech recognition engine 120A1 and/or the NLU engine 130A1 of the client device 110. In some additional and/or alternative implementations, the speech recognition engine 120A1 and/or the NLU engine 130A1 of the client device 110 can be used in the conjunction with the speech recognition engine 120A2 and/or the NLU engine 130A2 of the assisted call system 180 in a distributed manner. Moreover, the speech recognition model(s) 120A and/or the NLU model(s) 130A can be stored locally on the client device 110 and/or remotely at server(s) in communication with the client device 110 and/or the assisted call system 180 over the network(s) 190.

In various implementations, the speech recognition model(s) 120A are end-to-end speech recognition model(s), such that the speech recognition engine(s) 120A1 and/or 120A2 can generate recognized text corresponding to spoken input directly using the model. For instance, the speech recognition model(s) 120A can be end-to-end model(s) used to generate the recognized text on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms. Also, for example, when the speech recognition model(s) are not an end-to-end speech recognition model(s), the speech recognition engine(s) 120A1 and/or 120A2 can instead generate predicted phoneme(s) (and/or other representations). For instance, with such models the predicted phoneme(s) (and/or other representations) are then utilized by the speech recognition engine(s) 120A1 and/or 120A2 to determine recognized text that conforms to the predicted phoneme(s). In doing so, the speech recognition engine(s) 120A1 and/or 120A2 can optionally employ a decoding graph, a lexicon, and/or other resource(s).

In implementations when the user input engine 111 detects touch and/or typed input via a user interface input device of the client device 110, the automated assistant 115 can cause an indication of the touch input and/or an indication the typed input to be transmitted from the client device 110 to the assisted call system 180. In some versions of those implementations, the indication of the touch input and/or the indication the typed input can include underlying text of the touch input and/or text of the typed input, and the underlying text and/or the text can be processed, using NLU model(s) 130A, to determine intent(s) for the underlying text and/or the text.

As described herein, the assisted call engine 150 of the assisted call system 180 can further process the recognized text generated by the speech recognition engine(s) 120A1 and/or 120A2, the underlying text of touch input detected at the client device 110, the underlying text of typed input detected at the client device 110, and/or the intent(s) determined by the NLU engine(s) 130A1 and/or 130A2. The assisted call engine 150 includes, in various implementations, entity identification engine 151, task determination engine 152, parameter(s) engine 153, task performance engine 154, feedback engine 155, and recommendation engine 156.

The entity identification engine 151 can identify an entity to engage with, on behalf of the given user of the client device 110. The entity can be, for example, a person entity, a business entity, a location entity, and/or other entities. In some implementations, the entity identification engine 151 can also determine a particular type of entity for the identified entity. For example, a type of the person entity can be a friend entity, a family member entity, a co-worker entity, and/or other particular types of person entities. Further, a type of the business entity can be a restaurant entity, an airline entity, a hotel entity, a salon entity, a doctor's office entity, and/or other particular types of business entities. Moreover, a type of the location entity can be a school entity, a museum entity, a library entity, a park entity, and/or other particular types of location entities. In some implementations, the entity identifying engine 151 can also determine a specific entity for the identified entity. For example, a specific entity for a person entity can be a name of the person (e.g., Jane Doe, etc.), a specific entity for a business entity can be a name of the business (e.g., Hypothetical Café, Example Café, Example Airlines, etc.), and a specific entity for a location entity can be a name of the location (e.g., Hypothetical University, Example National Park, etc.). Although the entities described herein can be defined by various levels of granularity, they are collectively referred to herein as "entity" for the sake of simplicity.

In some implementations, the entity identification engine 151 can identify the entity to engage with, on behalf of the given user of the client device 110, based on user interaction(s) with the client device 110, prior to initiating an assisted call using the automated assistant 115. In some versions of those implementations, the entity can be identified responsive to receiving the user input to initiate the assisted call. For instance, if a given user of the client device 110 directs input (e.g., spoken or touch) to a call interface element of a software application (e.g., for a contact in a contacts application, for a search result in a browser application, and/or other callable entities included in other software applications), then the entity identification engine 151 can identify an entity associated with the call interface element. For example, if user input is directed to a call interface element associated with "Example Café" in a browser application, then the entity identification engine 151 can identify "Example Café" (or more generally a business entity or restaurant entity) as the entity to engage with, on behalf of the given user of the client device 110, during the assisted call.

In some implementations, the entity identification engine 151 can identify the entity to engage with, on behalf of the given user of the client device 110, based on metadata associated with an ongoing call. The metadata can include, for example, a phone number associated with the additional user, a location associated with the additional user, an identifier that identifies the additional user and/or an entity associated with the additional user, a time the ongoing call began, a duration of the ongoing call, and/or other metadata associated with telephonic calls. For instance, if a given user of the client device 110 is engaged in an ongoing call with an additional user, the entity identification engine 151 can analyze metadata of the ongoing call between the given user of the client device 110 and the additional user to identify a phone number associated with the additional user engaged with during the ongoing call. Further, the entity identification engine 151 can cross-reference the phone number with database(s) to identify the entity associated with the additional user, submit a search query for the phone number to identify a corresponding search result associated with the phone number to identify the entity associated with the additional user, and/or perform other actions to identify the entity associated with the additional user. For example, if a given user of the client device 110 is engaged in an ongoing call, then the entity identification engine 151 can analyze metadata associated with the ongoing call to identify an entity of "Example Airlines".

Moreover, the entity identification engine 151 can cause any identified entities to be stored in entity(s) database 151A. In some implementations, the identified entities stored in entity(s) database 151A can be indexed by entity and/or particular types of entities. For example, if the entity identification engine 151 identifies an "Example Café" entity, then "Example Café" can be indexed in the entity(s) database 151A as a business entity, and can optionally be further indexed as a restaurant entity. Further, if the entity identification engine 151 identifies an "Example Airlines" entity, then "Example Airlines" can also be indexed in the entity(s) database 151A as a business entity, and can optionally be further indexed as an airlines entity. By storing and indexing identified entities in the entity(s) database 151A, the entity identification engine 151 can easily identify and retrieve entities, thereby reducing subsequent processing to identify entities as they are encountered in future assisted calls and/or ongoing calls. Moreover, in various implementations, each entity can be associated with task(s) in the entity(s) database 151A.

The task determination engine 152 can determine task(s) to be performed on behalf of a given user of the client device 110. In some implementations, the task determination engine 152 can determine the task(s) prior to initiating assisted call using the automated assistant 115. In some versions of those implementations, the task determination engine 152 can determine the task(s) to be performed, on behalf of the given user of the client device 110, based on user input to initiate the assisted call. For example, if a given user of the client device 110 provides spoken input of "call Example Café to make a reservation for tonight", then the task determination engine 152 can utilize intent(s) of initiating a call and making a restaurant reservation (e.g., determined using NLU model(s) 130A) to determine a task of making a restaurant reservation based on the spoken input. As another example, if a given user of the client device 110 provides touch input selecting a call interface element associated with "Example Café", and the call interface indicates the given user wants to modify a restaurant reservation at Example Café, then the task determination engine 152 can determine a task of modifying an existing restaurant reservation based on the touch input.

In some additional and/or alternative versions of those implementation, the task determination engine 152 can determine the task(s) based on the identified entity to engage with during the assisted call. For example, a restaurant entity can be associated with a task of making a restaurant reservation, a task of modifying a restaurant reservation, a task of cancelling a restaurant reservation, and/or other tasks. As another example, a school entity can be associated with a task of inquiring as to closures, a task of reporting a student/employee will not attend school that day, and/or other tasks.

In other implementations, the task determination engine 152 can determine task(s) to be performed on behalf of the given user of the client device 110 during an ongoing call. In some versions of those implementations, a stream of audio data corresponding to a dialog between the given user of the client device 110 and an additional user of an additional client device can be processed as described herein (e.g., with respect to speech recognition model(s) 120A and NLU model(s) 130A). For example, if during an ongoing call between a given user of the client device 110 and an additional user associated with an additional client device, the task determination engine 152 identifies recognized text of "what is your frequent flier number", the task determination engine 152 can determine a task of providing a frequent flier number to the additional user. In some further versions of those implementations, the task determination engine 152 can also determine the task(s) based on the entity being stored in association with the task(s) in the entity(s) database 151A. For example, if the entity identification engine 151 identifies an additional user associated with an Example Airlines entity (e.g., based on metadata associated with the ongoing call as described above), then the task determination engine 152 can determine a task of providing a frequent flier number associated with Example Airlines to the additional user based on a task for providing a frequent flier number being stored in association with an airline entity.

The parameter(s) engine 153 can identify parameter(s) associated with the task(s) determined by the task determination engine 152. The automated assistant 115 can perform the task(s) using value(s) for the parameter(s). In some implementations, candidate parameter(s) can be stored in association with the task(s) in parameter(s) database 153A. In some versions of those implementations, candidate parameter(s) for a given task can be retrieved from the parameter(s) database responsive to identifying the entity to engage with, on behalf of the given user of the client device 110, during an assisted call. For example, for a task of making a restaurant reservation, the parameter(s) engine 153 can identify and retrieve one or more candidate parameters including a name parameter, a date/time parameter, a party size for the reservation parameter, a phone number parameter, various types of seating parameter(s) (e.g., booth seating or table seating, indoor seating or outdoor seating, etc.), a child parameter (i.e., whether children will be joining the reservation), a special occasion parameter (e.g., birthday, anniversary, etc.), and/or other candidate parameters. In contrast, for a task of modifying a restaurant reservation, the parameter(s) engine 153 can identify and retrieve candidate parameters including a name parameter, a date/time of the original reservation parameter, date/time of the modified reservation parameter, a party size of the modified reservation parameter, and/or other candidate parameter(s).

In some additional and/or alternative implementations, the parameter(s) engine 153 can identify parameter(s) for a given task during an ongoing call between a given user of the client device 110 and an additional user of an additional client device. In some versions of those implementations, the parameter(s) identified for the given task during the ongoing call may or may not be candidate parameter(s) stored in association with the given task in parameter(s) database 153A. As described above, a stream of audio data corresponding to a dialog between the given user and the additional user can be processed to determine task(s) to be performed during the ongoing call. The parameter(s) engine 153 can determine whether the additional user is requesting information associated with a given parameter that is not known to the automated assistant 115. For example, if during the ongoing call, a representative for Example Airlines requests a frequent flier number from the given user of the client device, then the parameter(s) engine 153 can identify an "Example Airlines frequent flier number" parameter based on intent(s) included in recognized text of the conversation and/or based on an identified "Example Airlines" entity.

Moreover, in some implementations, candidate parameter(s) stored in the parameter(s) database 153A can be mapped to various entities stored in entity(s) database 151A. By mapping the candidate parameter(s) stored in the parameter(s) database 153A to various entities stored in entity(s) database 151A, the assisted call engine 150 can easily identify parameter(s) for the task(s) in response to identifying a given entity. For example, in response to identifying an "Example Café" entity (or more generally a restaurant entity), the assisted call engine 150 can identify pre-defined task(s) (e.g., stored in association with the "Example Café" entity and/or a restaurant entity in the entity(s) database 151A) to determine a set of candidate parameter(s), and in response to identifying a particular task (e.g., based on the identified entity and/or user input), the assisted call engine 150 can determine the candidate parameter(s) associated with the particular task for the identified entity. In other implementations, the entity(s) database 151A and the parameter(s) database 153A can be combined as one database with various indices (e.g., indexed by entity, indexed by task(s), and/or other indices), such that the entity(s), task(s), and candidate parameter(s) can each be stored in association with one another.

As noted above, the automated assistant 115 can perform the task(s), on behalf of a given user of the client device 110, using value(s) for the parameter(s). The parameter(s) engine 153 can also determine value(s) for the parameter(s). In implementations when a given user of the client device 110 provides user input to initiate an assisted call, the parameter(s) engine 153 can cause the automated assistant 115 to engage in a dialog with the given user (e.g., visually and/or audibly via the client device 110), prior to initiating the assisted call, to solicit further user input requesting information for candidate parameter(s). As described herein, the automated assistant 115 can generate prompt(s) requesting the information, and can render the prompts to solicit corresponding value(s) (or a subset thereof) audibly (e.g., via speaker(s) of the client device 110) and/or visually (e.g., via display(s) of the client device 110). For example, in response to receiving user input to initiate an assisted call to make a reservation at Example Café(e.g., via touch input or spoken input), the automated can generate prompt(s) requesting further user input that includes a value for a date/time parameter for the reservation, a value for a number of people parameter for the reservation, and so on for the candidate parameter(s) (or a subset thereof).

In some versions of those implementations, the parameter(s) engine 153 can determine the value(s) for the candidate parameter(s) based on user profile(s), stored on user profile(s) database 153B, of the given user of the client device 110. In some further versions of these implementations, the parameter(s) engine 153 can determine the value(s) for the candidate parameter(s) without requesting any further user input from the given user. The parameter(s) engine 153 can access the user profile(s) database 153B, and can retrieve value(s) for a name parameter, a phone number parameter, a date/time parameter from software applications (e.g., a calendar application, an e-mail application, a contacts application, a reminders application, a notes application, an SMS or text messaging application, and/or other software applications). The user profile(s) can include, for example and with permission from the given user, linked accounts of the given user, email accounts of the given user, photo albums of the given user, social media profile(s) of the given user, contacts of the given user, user preferences and/or other information. For example, if a given user of the client device 110 is engaged in a text messaging conversation with a friend and discussing date/time information for a restaurant reservation at a given entity prior to providing user input to initiate an assisted call, then the parameter(s) engine 153 can utilize the date/time information from the text messaging conversation as value(s) for date/time parameters, and the automated assistant need not prompt the given user for date/time information for the restaurant reservation. As discussed in greater detail herein (e.g., with respect to FIG. 4B), the given user of the client device 110 can modify value(s) for candidate parameter(s) prior to the assisted call being initiated.

Moreover, in various implementations, some candidate parameter(s) for a given task may be required parameter(s), whereas other candidate parameter(s) for the given task may be optional parameter(s). In some versions of those implementations, whether a given parameter is a required parameter or an optional parameter can be based on the task. Put another way, the required parameter(s) for a given task can be a minimum amount of information that needs to be known to perform a given task. For example, for a restaurant reservation task, a name parameter and a time/date parameter may be the only required parameter(s). However, the restaurant reservation task may be of a greater benefit to both the given user and a restaurant associated with the restaurant reservation task if value(s) are known for optional parameter(s) (e.g., a party size to better accommodate the reservation, a phone number to call if any additional communication is needed, and so on). Accordingly, the automated assistant 115 can generate prompt(s) for at least the required parameter(s), and optionally, prompt(s) for the optional parameter(s).

In implementations when the assisted call system 180 determines an additional user that is engaged in an ongoing call with a given user of the client device 110 requests information for parameter(s), the parameter(s) engine 153 can determine the value(s) based on user profile(s), stored on user profile(s) database 153B, of the given user of the client device 110. In some versions of those implementations, the parameter(s) engine 153 can determine the value(s) for the parameter(s) responsive to identifying the additional user is requesting information for the parameter(s). In other versions of those implementations, the parameter(s) engine 153 can determine the value(s) for the parameter(s) responsive to user input from the given user of the client device 110 requesting the information for the parameter(s).

In various implementations, the task performance engine 154 can cause the automated assistant 115 to engage in a dialog, with an additional user associated with the identified entity using synthesized speech, during the assisted call to perform the task(s). The task performance engine 154 can provide text and/or phonemes that include at least the value to the speech synthesis engine 140A1 of the client device 110 and/or the speech synthesis engine 140A2 of the assisted call system 180 to generate synthesized speech audio data. The synthesized speech audio data can be transmitted to the additional client device of the additional user for audible rendering at the additional client device. The speech synthesis engine(s) 140A1 and/or 140A2 can generate, using speech synthesis model(s) 140A, the synthesized speech audio data that includes synthesized speech corresponding to at least the value(s) for the parameter(s). For example, the speech synthesis engine(s) 140A1 and/or 140A2 can determine a sequence of phonemes determined to correspond to information for parameter(s) requested by the additional user, and can process the sequence of phonemes using the speech synthesis model(s) 140A, to generate synthesized speech audio data. The synthesized speech audio data can be, for example, in the form of an audio waveform. In determining a sequence of phonemes that correspond to at least the value(s) for the parameter(s), the speech synthesis engine(s) 140A1 and/or 140A2 can access a tokens-to-phonemes mapping stored locally at the client device 110 or stored at server(s) (e.g., over network(s) 190).

In some implementations, the task performance engine 154 can cause the client device 110 to initiate an assisted call with an entity to engage with, on behalf of a given user of the client device 110, and perform the task(s) on behalf of the given user of the client device 110. Moreover, the task performance engine 154 can utilize the synthesized speech audio data that includes at least the value(s) for the parameter(s) to perform the task(s) on behalf of the given user of the client device 110. For example, for a task of making a restaurant reservation, the automated assistant 115 can cause synthesized speech to be rendered, at an additional client device associated with an additional user, that identifies the automated assistant 115 on behalf of a given user of the client device 110, and that states the task(s) to be performed on behalf of the given user during the assisted call (e.g., "This is Jane Doe's Automated Assistant calling to make a reservation on behalf of Jane Doe").

In some versions of those implementations, the automated assistant 115 can cause the corresponding value(s) for various candidate parameter(s) (e.g., determined using parameter(s) engine 153 as described above) to be rendered without being explicitly requested by the additional user associated with the entity. Continuing with the above example, the automated assistant 115 can provide a value for a day/time parameter for the reservation (e.g., "tonight at 7:00 PM", etc.), a value for a number of people parameter for the reservation (e.g., "two", "three", "four", etc.), a value for a type of seating parameter for the reservation (e.g., "booth", "indoor", etc.), and/or other value(s) for other candidate parameter(s) at the beginning of a dialog. In other versions of these implementations, the automated assistant 115 can engage in a dialog with the additional user of the additional computing device, and provide particular value(s) for parameter(s) explicitly requested by the additional user associated with the entity. Continuing with the above example, the automated assistant 115 can process audio data capturing speech of the additional user (e.g., "For what time and for how many people?", etc.), and can determine information for parameter(s) being requested by the additional user (e.g., "tonight at 7:00 PM for five people", etc.) responsive to receiving the request from the additional user.

Moreover, in some versions of those implementations, the task determination engine 152 can determine that a request, from an additional user associated with an entity, is a request for information associated with additional parameter(s) for which the automated assistant 115 does not know corresponding additional value(s). For example, for a restaurant reservation task, assume the automated assistant 115 knows values for a date/time information parameter, a number of persons parameter, and a type of seating parameter, but the additional user requests information for a children parameter that is not known (i.e., whether any children be joining the reservation). In response to determining the additional user is requesting the information for the children parameter that is not known, the automated assistant 115 can cause the client device 110 to render a notification that indicates the additional value for children parameter has been requested by the additional user (e.g., using rendering engine 113), and that prompts the given user of the client device 110 to provide the additional value for the children parameter.

In some further versions of those implementations, a type of the notification rendered at the client device 110, and/or one or more properties of rendering the notification (e.g., volume, brightness, size) can be based on a state of the client device 110 (e.g., determined using device state engine 112) and/or a state of the ongoing call. The state of the ongoing call can indicate, for example, which value(s) have been conveyed and/or not yet conveyed in the ongoing call and/or can indicate which component(s) of the task of the ongoing call have been completed and/or not yet completed in the ongoing call. The state of the client device 110 can be based on, for example, software application(s) operating in the foreground of the client device 110, software application(s) operating in the background of the client device 110, whether the client device 110 is in a locked state, whether the client device 110 is in a sleep state, whether the client device 110 is an off state, sensor data from sensor(s) of the client device 110, and/or other data. For example, if a state of the client device 110 indicates that a software application (e.g., an automated assistant application, a call application, an assisted call application, and/or other software applications) displaying a transcription of the assisted call is operating in a foreground of the client device 110, then the type of notification may be a banner notification, a pop-up notification, and/or other types of visual notifications. As another example, if a state of the client device 110 indicates that the client device 110 is in a sleep or locked state, then the type of notification may be an audible indication via speaker(s) and/or a vibration via the speaker(s) or other hardware components of the client device 110. As yet another example, if sensor data from presence sensor(s), accelerometer(s), and/or other sensor(s) of the client device indicate that the given user is not currently near and/or currently holding the client device, then a more intrusive notification can be provided (e.g., visual and audible at a first volume level). On the other hand, if such sensor data indicates that the given user is currently near and/or currently holding the client device, then a less intrusive notification can be provided (e.g., visual only, or visual and audible at a second volume level that is lesser than the first volume level). As yet another example, a more intrusive notification can be provided when the state of the dialog indicates that the dialog is near completion, while a less intrusive notification can be provided when the state of the dialog indicates that the dialog is not near completion.

In some further versions of those implementations, even though the automated assistant 115 does not know corresponding additional value(s) for the additional parameter(s) requested by the additional user, the task determination engine 152 can cause the automated assistant 115 to continue the dialog with the additional user. The automated assistant 115 can then provide the additional value(s) later in the dialog after receiving further user input responsive to the request from the additional user. For example, for a restaurant reservation task, assume the automated assistant 115 knows values for a date/time information parameter, a number of persons parameter, and a type of seating parameter, and further assume that the additional user requests the value(s) for the date/time information parameter and the number of persons parameter. Further assume the additional user next requests a value for a children parameter for which the automated assistant 115 does not know a value. In this example, the task determination engine 152 can cause the automated assistant 115 to render, at the additional client device of the additional user, synthesized speech that includes an indication that the requested information for whether children will be joining is not currently known, and that the automated assistant 115 can continue the assisted call by providing other value(s) (e.g., for the type of seating) until further user input, responsive to the notification, including the value for the children parameter is detected at the client device 110. In response to receiving the further user input, the automated assistant 115 can provide the additional value as a standalone value (e.g., "no children will be joining the reservation"), or as a follow-on value (e.g., "Jane Doe prefers booth seating, by the way, no children will be joining the reservation").

Moreover, in implementations where the additional user requests information for additional parameter(s) that are not known, the automated assistant 115 can end the assisted call if the further user input, responsive to the notification requesting the information, is not received within a threshold duration of time (e.g., 15 seconds, 30 seconds, 60 seconds, and/or other durations of time). In some versions of those implementations, the threshold duration of time can begin when the notification requesting the information is rendered at the client device 110 of the given user. In other versions of those implementations, the threshold duration of time can begin when a last value known to the automated assistant 115 is requested by the additional user or proactively provided by the automated assistant 115 (independent of the additional user request).

Further, in implementations where the additional user requests information for additional parameter(s) that are not known, the feedback engine 155 can store the additional parameter(s) in the parameter(s) database 153A as candidate parameter(s) for the task. In some versions of those implementations, the feedback engine 153A can map the additional parameter(s) to an entity, stored in entity(s) database 151A, associated with the additional user. In some further versions of those implementations, the feedback engine 155 can map the additional parameter(s) to the entity if additional user(s) associated with the entity request the additional parameter(s) a threshold number of times from a plurality of users while assisted speech is active. For example, if restaurant entities ask, during dialog across a plurality of assisted calls initiated by a plurality of users via respective client devices, whether the restaurant reservation will include children at least a threshold number of times (e.g., 100 times, 1,000 times, and/or other numerical thresholds), then the feedback engine 155 can map a children parameter to various restaurant entities in the entity(s) database 151A. In this example, the children parameter can be considered a new candidate parameter to solicit a value for prior to initiating future assisted calls for restaurant reservation task(s) with the various restaurant entities and/or a specific entity that frequently requests information for the children parameter. In these and other manners, the value can be solicited prior to initiating the future assisted calls, thereby shortening the duration of the future assisted calls and/or preventing the need to utilize computational resources in rendering prompts for the value in the future assisted calls.

In some implementations, the task performance engine 154 can cause the automated assistant 115 to provide output relevant to an ongoing call with an additional user associated with an entity, even if the ongoing call was not initiated using assisted speech (i.e., a non-assisted call), to perform task(s) on behalf of a given user of the client device 110. For example, the automated assistant 115 can interrupt the ongoing call to cause synthesized speech that includes value(s) to be rendered at the additional client device 110. In some versions of those implementations, the automated assistant 115 can provide output relevant to the ongoing call in response to user input from a given user of the client device 110 (e.g., as described with respect to FIG. 5A). In some further versions of those implementations, the automated assistant 115 may not process the audio data corresponding to the ongoing call, thereby obviating the need to obtain consent from the additional user. Rather, the automated assistant 115 can analyze metadata associated with the ongoing call, and determine corresponding value(s) for the parameter being requested by the additional user based on the metadata and/or the user input. For example, the client device 110 can detect user input that activates assisted call, and that asks the automated assistant 115 to retrieve the corresponding value(s) requested by the additional user (e.g., a value for a frequent flier number parameter), and can determine the value is associated with a particular entity (e.g., Example Airlines) based on the metadata associated with the ongoing call even though the particular entity was not explicitly identified in the request. Access-restricted data of the user can then be searched, by the automated assistant and using search parameters (e.g., term(s)) based on both the request of the additional user (e.g., "frequent flier") and the metadata (e.g., "Example Airlines"). Moreover, in some further versions of those implementations, the user input for the automated assistant 115 to provide output relevant to the ongoing call is responsive to a notification, generated by the automated assistant 115 and rendered at the client device 110 (e.g., using rendering engine 113), that indicates the assisted call system 180 is capable of providing the value(s) to the additional user (e.g., as described with respect to FIG. 5B). For example, the automated assistant 115 can proactively notify a given user of the client device 110 that the assisted call system 180 can provide the corresponding value(s) for the parameter(s) being requested by the additional user.

Figure 5A:
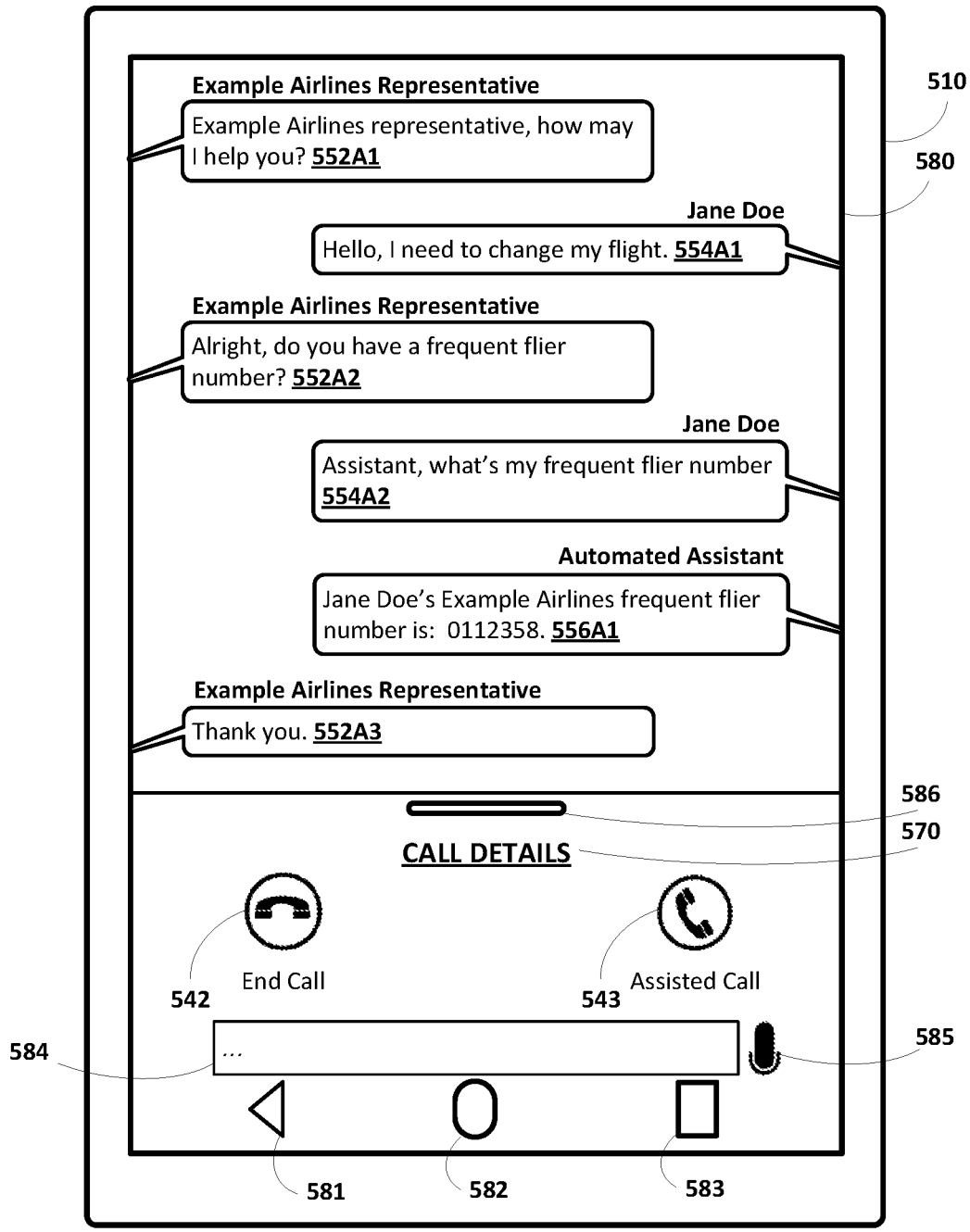
FIGS. 5A, 5B, and 5C depict various non-limiting examples of user interfaces with respect to providing assistive output during an ongoing non-assisted call, in accordance with various implementations.
Figure 5B:
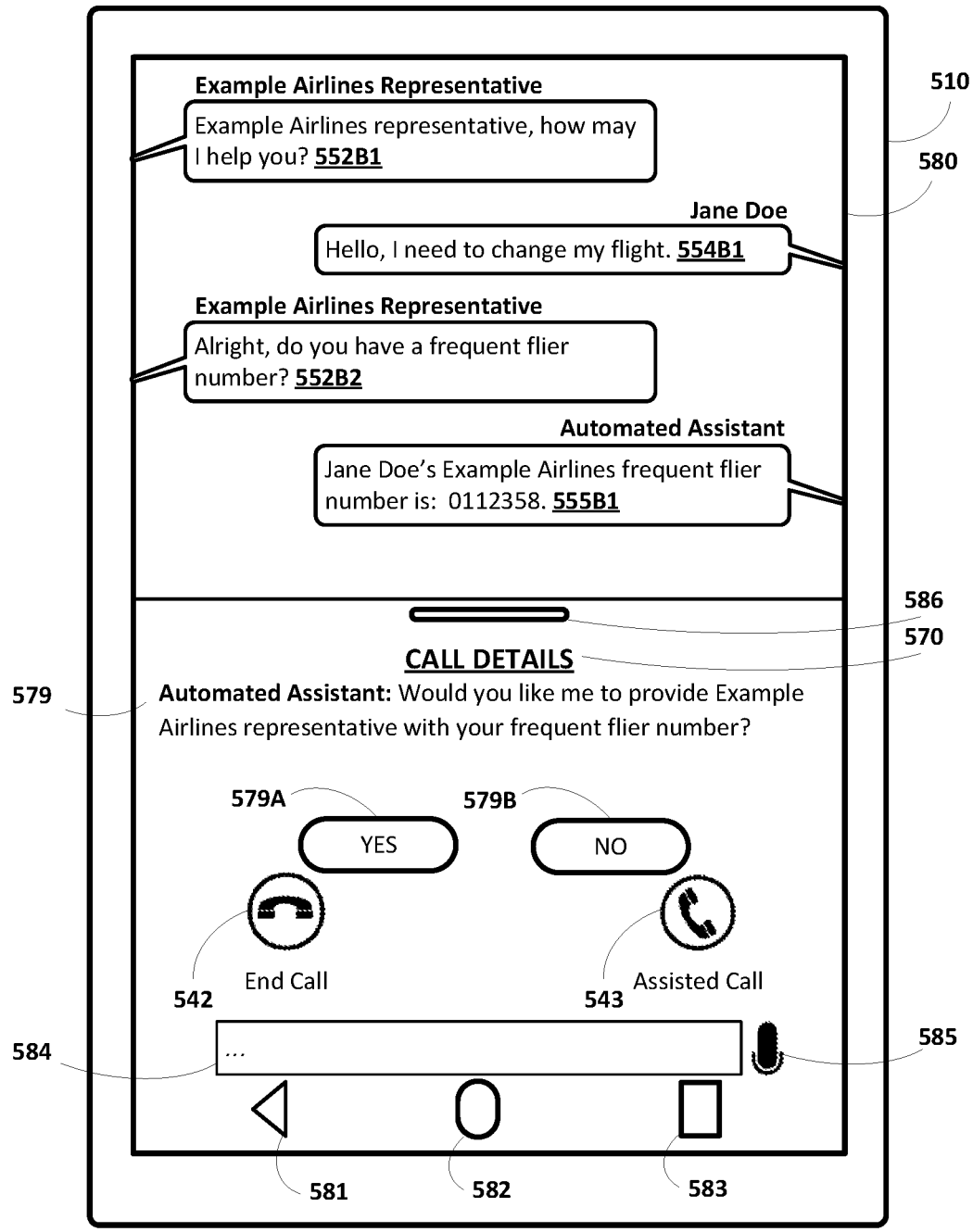
Figure 5C:
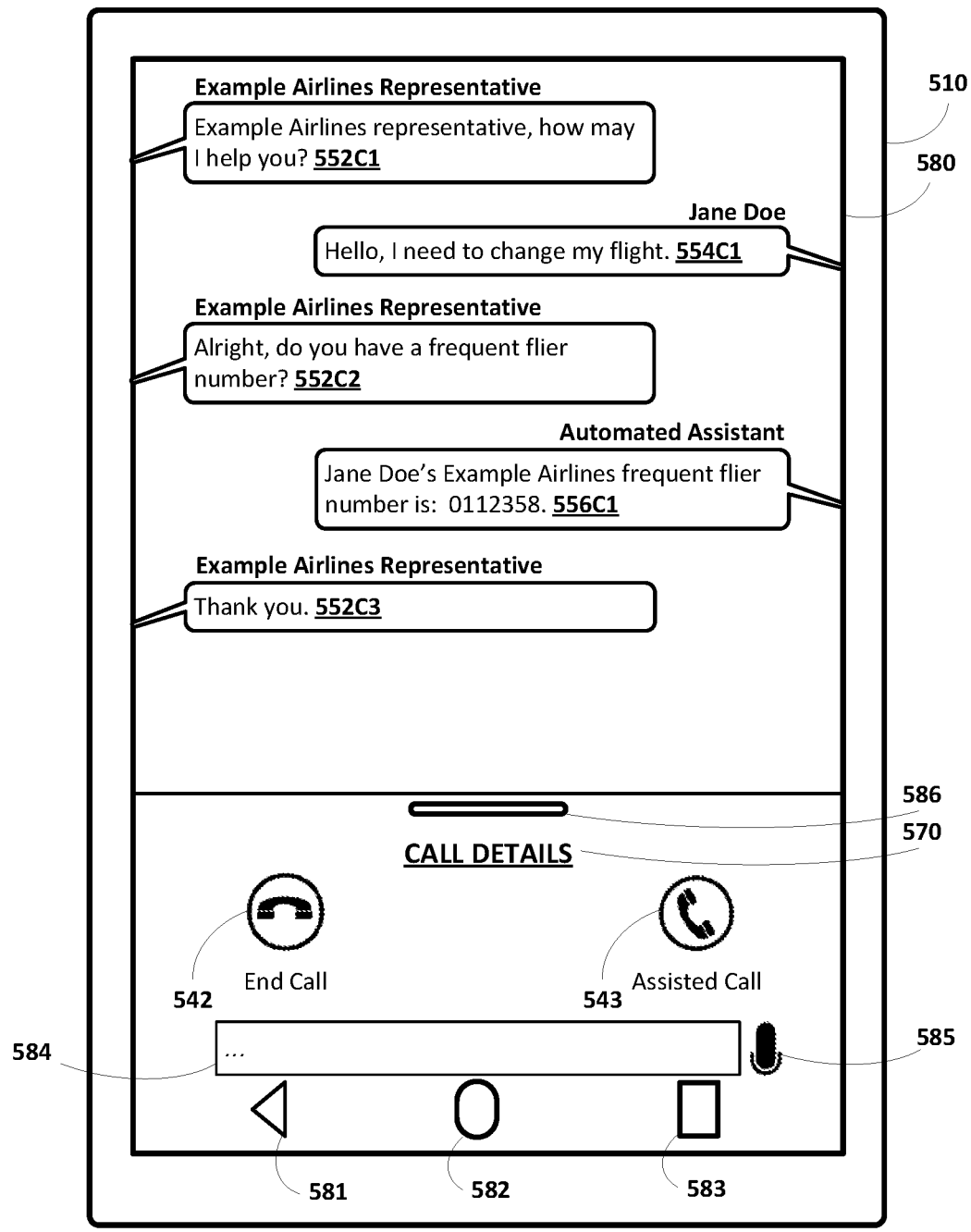

In other versions of those implementations, the automated assistant 115 provides output (e.g., synthesized speech within the ongoing call) relevant to the ongoing call in response to determining information is being requested by the additional user, and without receiving any user input from a given user of the client device 110 (e.g., as described with respect to FIG. 5C). In some versions of those implementations, the automated assistant 115 can automatically provide the value(s) based on a confidence metric for the value satisfying a confidence threshold. The confidence metric can be based on, for example, whether the given user previously provided the determined value in response to receiving a prior request for the same value, whether the parameter(s) identified during the ongoing call are candidate parameter(s) stored in association with the task identified during the ongoing call, a source from which the value is determined (e.g., an email/calendar application vs. a text messaging application), and/or manners of determining a confidence metric. For example, for an ongoing call between a given user of the client device 110 and an additional user associated with an airlines entity, the assisted call system 180 can determine a frequent flier number being requested by the additional user, and the assisted call system 180 can cause the automated assistant 115 to automatically provide, as part of the ongoing call, synthesized speech that includes the frequent flier number—and can provide the synthesized speech automatically without receiving any user input that requests the automated assistant 115 provide the frequent flier number. In some versions of these implementations, a given user of the client device 110 may have to authorize assisted call to automatically interrupt ongoing calls in settings associated with assisted call.

In various implementations, the recommendation engine 156 can determine candidate value(s) to be conveyed in a dialog, and can cause the automated assistant 115 to provide the candidate value(s) as recommendation(s) for a given user of the client device 110. In some implementations, the candidate value(s) can be transmitted to the client device 110 over the networks(s) 190. Further, the candidate value(s) can be visually rendered on a display of the client device (e.g., using rendering engine 113) as recommendation(s) responsive to request(s) from an additional user. In some versions of those implementations, the recommendation(s) can be selectable, such that when user input is directed to a given recommendation (e.g., as determined by the user input engine 111), the given recommendation can be incorporated into the synthesized speech that is audibly rendered at an additional client device of the additional user.

In some implementations, the recommendation engine 156 can determine candidate value(s) based on a request for information from an additional user. For example, if the request is a yes or no question (e.g., "will any children be included in the reservation"), then the recommendation engine 156 can determine a first recommendation that includes a "yes" value, and a second recommendation that includes a "no" value. In other implementations, the recommendation engine 156 can determine candidate value(s) based on user profile(s), stored in the user profile(s) database 153B, of a given user associated with the client device 110. For example, if the request solicits specific information (e.g., "how many children there be"), then the recommendation engine 156 can determine a given user of the client device 110 has three children based on, and with permission from the given user, the user profile(s) of the given user—and can determine a first recommendation that includes a "three" value, a second recommendation that includes a "two" value, a third recommendation that includes a "one" value, and/or other recommendation(s) including other value(s). The various recommendations described herein can be visually and/or audibly rendered at the client device 110 for presentation to a given user associated with the client device.

As described herein, the rendering engine 113 can render various notifications or other output at the client device 110. The rendering engine 113 can render the various notifications described herein audibly and/or visually. Moreover, the rendering engine 113 can cause a transcript of dialog to be rendered on a user interface of the client device 110. In some implementations, the transcript can correspond to a dialog between a given user of the client device 110 and the automated assistant 115 (e.g., as described with respect to FIG. 4B). In other implementations, the transcript can correspond to a dialog between an additional user of an additional client device and the automated assistant 115 (e.g., as described with respect to FIGS. 4C and 4D). In yet other implementations, the transcript can correspond to a dialog between a given user of the client device 110, an additional user of an additional client device, and the automated assistant 115 (e.g., as described with respect to FIGS. 5A-5C).

In some implementations, the scheduling engine 114 can cause the automated assistant 115 to include, along with and/or included in a notification indicating a result of performance of task(s), recommendation(s) that the automated assistant perform additional (or follow-on) task(s) based on a result of the performance of the task(s). In some versions of those implementations, the recommendation can be selectable, such that when user input is directed to a given recommendation (e.g., as determined by the user input engine 111), the given recommendation can cause the additional task(s) to be performed. For example, for a successful restaurant reservation task, the automated assistant 115 can render, via a user interface of a display of the client device 110, a selectable element that, upon selection by a given user of the client device 110, causes the scheduling engine 114 to create a calendar entry for the successful restaurant reservation. As another example, for the successful restaurant reservation task, the automated assistant 115 can send a SMS or text message, indicating the restaurant reservation task was successfully performed, to other user(s) that are joining the restaurant reservation. In contrast, for an unsuccessful restaurant reservation task, the automated assistant 115 can render a selectable element that, upon selection by a given user of the client device 110, causes the scheduling engine 114 to create a reminder and/or calendar entry to perform the restaurant reservation task again at a later time and before the time/date value of the attempted restaurant reservation task (e.g., automatically performed by the automated assistant 115 at a later time or performed by the automated assistant 115 in response to a user selection of the reminder and/or calendar entry).

In other implementations, the scheduling engine 114 can cause the automated assistant 115 to automatically perform, responsive to determining a result of performance of task(s), additional (or follow-on) task(s) based on the result of the performance of the task(s). For example, for a successful restaurant reservation task, the automated assistant 115 can automatically create a calendar entry for the successful restaurant reservation, automatically send a SMS or text message indicating the restaurant reservation task was successfully performed to other user(s) that are joining the restaurant reservation, and/or other additional task(s) that can be performed by the automated assistant 115 responsive to the restaurant reservation task being performed successfully. In contrast, for an unsuccessful restaurant reservation task, the automated assistant 115 can automatically create a reminder and/or calendar entry to perform the restaurant reservation task again at a later time and before the time/date value for the restaurant reservation task (e.g., automatically performed by the automated assistant 115 at a later time or performed by the automated assistant 115 in response to a user selection of the reminder and/or calendar entry).

By using the techniques described herein, various technical advantages can be achieved. As one non-limiting example, the automated assistant 115 can more quickly conclude an assisted call since the dialog of the assisted call is not halted to wait for value(s) for the additional parameter(s) when information, not currently known to the automated assistant 115, is requested by the additional user. Both network and computational resources can be conserved since a length of the assisted call can be reduced by using the techniques disclosed herein. As another non-limiting example, the automated assistant 115 can provide corresponding value(s) for parameter(s) during performance of task(s) by a given user during an ongoing telephonic call. By providing the corresponding value(s), either automatically or in response to explicit user input as described above, the client device 110 receives fewer inputs from the given user of the client device 110 since the user need not navigate to various applications having disparate user interfaces to determine the corresponding value(s), thereby conserving computational resources at the given client device. Moreover, the system conserves both computational and network resources by concluding the ongoing call more quickly, since the user need not navigate to these various applications.

Figure 2:
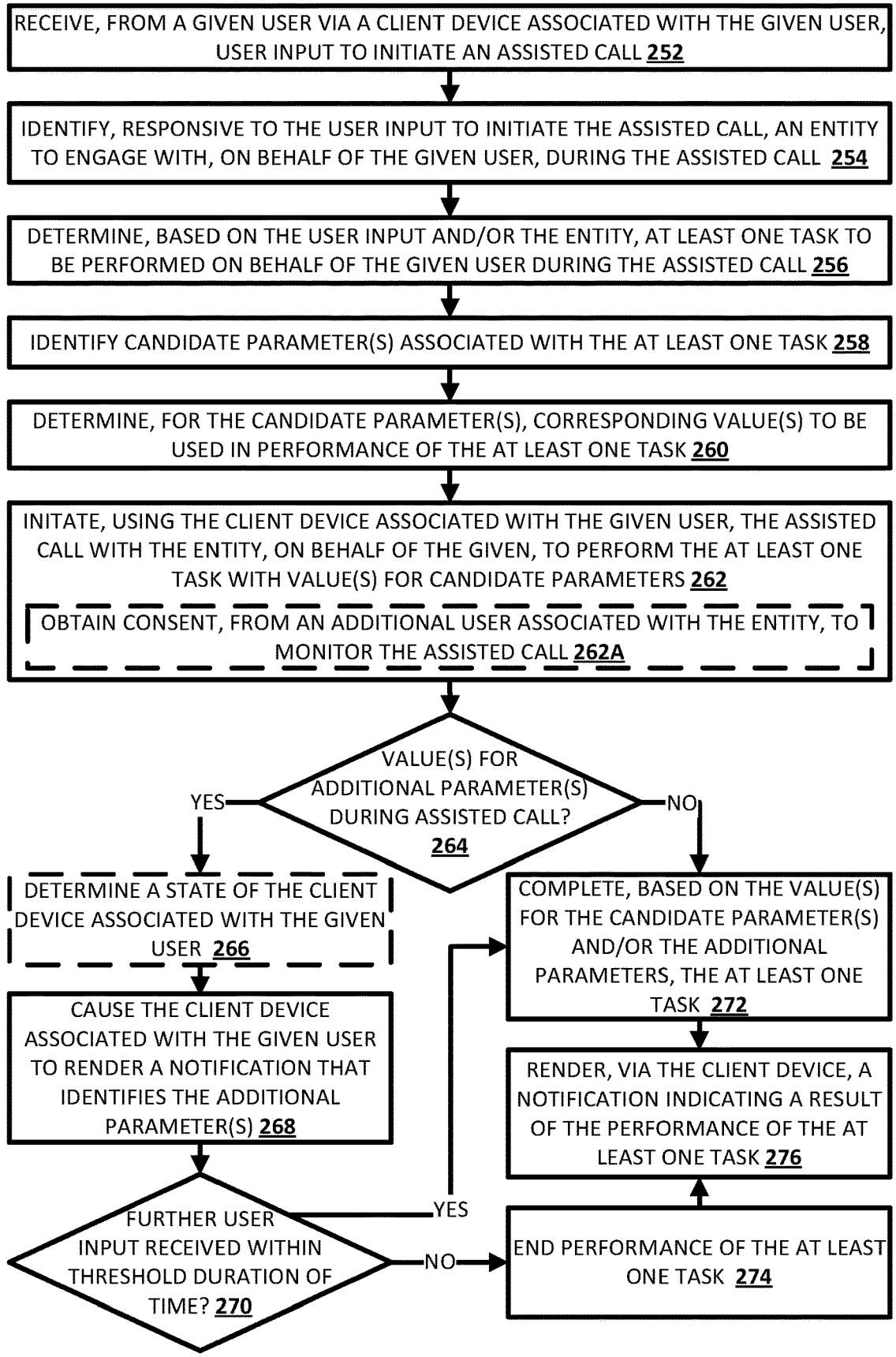
FIG. 2 depicts a flowchart illustrating an example method of performing an assisted call, in accordance with various implementations.

FIG. 2 depicts a flowchart illustrating an example method 200 of performing an assisted call, in accordance with various implementations. For convenience, the operations of method 200 are described with reference to a system that performs the operations. This system of method 200 includes one or more processors and/or other component(s) of computing device(s) (e.g., client device 110 of FIG. 1, client device 410 of FIGS. 4A-4D, client device 510 of FIGS. 5A-5C, computing device 610 of FIG. 6, one or more servers, and/or other computing devices). Moreover, while operations of method 200 are shown in a particular order, this is not meant to be limiting. One or more operations may be reordered, omitted, or added.

At block 252, the system receives, from a given user via a client device associated with the given user, user input to initiate an assisted call. In some implementations, the user input is spoken input detected via microphone(s) of the client device. For example, the spoken input can include "call Example Café", or specifically "use assisted call to call Example Café". In other implementations, the user input is touch input detected at the client device. For example, the touch input can be detected while various software applications are operating on the client device (e.g., a browser application, a messaging application, an email application, a notes application, a reminders application, and/or other software applications).

At block 254, the system identifies, responsive to the user input to initiate the assisted call, an entity to engage with, on behalf of the given user, during the assisted call. The entity can be identified based on the user input. In implementations when the user input is spoken input, the entity can be identified based on processing audio data that captures the spoken input (e.g., using speech recognition model(s) 120A and/or NLU model(s) 130A of FIG. 1), to identify the entity included in the spoken input (e.g., a business entity, a specific business entity, a location entity, and/or other entities). In implementations when the user input is touch input, the entity can be identified based on user interaction(s) with the client device (e.g., touch input selecting a contact entry associated with the entity, a search result associated with the entity, an advertisement associated with the entity, and/or other user interaction(s)).

At block 256, the system determines, based on the user input and/or the entity, at least one task to be performed on behalf of the given user during the assisted call. In various implementations, pre-defined task(s) can be stored in association with a plurality of corresponding entities in one or more database(s) (e.g., entity(s) database 151A of FIG. 1). For example, tasks of book a flight, change a flight, cancel a flight, a lost baggage inquiry, and/or other tasks can be stored in association with a plurality of distinct airlines entities. In some implementations, the at least one task to be performed can be determined based on the user input. For example, if spoken input of "call Example Café to make a reservation for tonight at 7:00 PM" is received at the client device, the system can determine the spoken includes a restaurant reservation task. In other implementations, the at least one task to be performed can be determined based on the entity identified at block 254. For example, if spoken input of "call Example Café" is received at the client device (i.e., without specifying a restaurant reservation task), the system can infer a task of making a reservation based on it being a predefined task associated with restaurant entities.

At block 258, the system identifies candidate parameter(s) associated with the at least one task. In various implementations, the candidate parameter(s) can be stored in association with the at least one task (determined at block 256) and/or in association with the at least one entity (determined at block 256) in one or more databases (e.g., parameter(s) database 153A of FIG. 1). For example, tasks of book a flight, change a flight, cancel a flight, a lost baggage inquiry, and/or other tasks can be stored in association with corresponding candidate parameters. Also, for example, a task of change a flight associated with Airline Entity 1 can be stored in association with first corresponding parameters and a task of change a flight associated with Airline Entity 2 can be stored in association with second corresponding parameters. As another example, Restaurant Entity 1 can be stored in association with first corresponding parameters and Restaurant Entity 2 can be stored in association with second corresponding parameters.

At block 260, the system determines, for the candidate parameter(s), corresponding value(s) to be used in performance of the at least one task. In some implementations, the value(s) for the candidate parameters can be determined based on user profile(s) of the given user that are stored in one or more databases (e.g., user profile(s) database 153B of FIG. 1). The user profile(s) can include, for example, linked accounts of the given user, email accounts of the given user, photo albums of the given user, social media profile(s) of the given user, contacts of the given user, user preferences and/or other information. For example, for a salon reservation task, the system can determine a name parameter and a phone number parameter for the given user based on a contacts application, and can determine a preferred stylist at the salon based on prior communications (e.g., email messages, text or SMS messages, phone calls, and/or other communications) with a particular stylist. In some additional and/or alternative implementations, the value(s) for the candidate parameters can additionally or alternatively be determined based on further user input that is responsive to prompt(s) that are rendered visually and/or audibly at the client device, and that request the information for the parameters. In some versions of those implementations, the system can generate prompt(s) only for corresponding value(s) for candidate parameter(s) the system could not determine based on the user profile(s). For example, for the salon reservation task mentioned above, the system already knows value(s) for a name parameter, a phone number parameter, and a phone number parameter, so the system may only generate a prompt requesting a value for a date/time parameter. As described herein (e.g., with respect to FIG. 4B), the system can provide an opportunity for the given user of the client device to modify the value(s) for the candidate parameter(s) prior to initiating the assisted call.

At block 262, the system initiates, using the client device associated with the given user, the assisted call with the entity, on behalf of the given user, to perform the at least one task with the value(s) for the candidate parameter(s). The system can process audio data received at the client device, from the additional computing device, to determine value(s) for parameter(s) being requested by the additional user. Further, the system can generate synthesized speech audio that is transmitted an additional client device of an additional user associated with the entity identified at block 254, and that includes at least the value(s) for parameter(s) (e.g., proactively or responsive to being requested by the additional user). In some implementations, the system can engage in a dialog with the additional user, and can generate synthesized speech audio that includes particular value(s) that are included in information requested by the additional user. For example, for a restaurant reservation task, the additional user can request information for a date/time parameter, and the system can generate, responsive to determining the request from additional user is for information for a date/time parameter, synthesized speech audio data that includes the date/time value. Further, the system can cause the synthesized speech audio data to be transmitted to the additional client device of the additional user, and synthesized speech included in the synthesized speech audio data to be audibly rendered at the additional client device. The additional user can request further information for various parameter(s), and the system can provide the value(s) to the additional user to perform the restaurant reservation task.

In some implementations, method 200 can include optional sub-block 262A. If included, at optional sub-block 262A, the system obtains consent, from an additional user associated with the entity, to monitor the assisted call. For example, the system can obtain consent upon initiating the assisted call and prior to performance the task(s). If the system consent from the additional user associated, then the system can perform the task(s). However, if the system does not obtain consent from the additional user, then the system can cause the client device to render a notification to the given user indicating that the given user is needed to perform the task and/or end the call and render a notification to the given user indicating that the task(s) was not performed.

At block 264, the system determines whether any information associated with additional parameter(s) is requested, by an additional user associated with the entity, during the assisted call. As noted above, the system can process audio data received at the client device, from the additional computing device, to determine value(s) being requested by the additional user. Moreover, the system can determine whether the value(s) being requested are for additional parameter(s) that the system has not previously resolved, such that the value(s) being requested by the additional user are not currently known to the system. For example, if the system did not previously determine a value for a type of seating parameter for a restaurant reservation task, then the type of seating parameter can be considered an additional parameter having a value that is not currently known to the system. If, at an iteration of block 264, the system determines that no information associated with additional parameter(s) are requested, by an additional user associated with the entity, during the assisted call, then the system may proceed to block 272, which is discussed in greater detail below.

If, at an iteration of block 264 that includes optional block 266, the system determines that value(s) for additional parameter(s) are included in a request, from an additional user associated with the entity, during the assisted call, then the system may proceed to optional block 266. In implementations that do include optional block 266, the system may proceed directly from block 264 to block 266, which is discussed in greater detail below.

If included, at optional block 266, the system determines a state of the client device associated with the given user. The state of the client device can be based on, for example, software application(s) operating in the foreground of the client device, software application(s) operating in the background of the client device, whether the client device 110 is in a locked state, whether the client device is in a sleep state, whether the client device 110 is an off state, sensor data from sensor(s) of the client device, and/or other data. In some implementations, the system additionally or alternatively determines a state of the ongoing call at block 266.

At block 268, the system causes the client device associated with the given user to render a notification that identifies that additional parameter(s). The notification can further request the value(s) for the additional parameter(s) included in the information. In implementations that include optional block 266, a type of the notification rendered by the client device, and/or one or more properties for the rendering, can be based on the state of the client device and/or the state of the ongoing call determined at optional block 266. For example, if a state of the client device indicates that a software application (e.g., an automated assistant application, a call application, an assisted call application, and/or other software applications) displaying a transcription of the assisted call is operating in a foreground of the client device, then the type of notification may be a banner notification, a pop-up notification, and/or other types of visual notifications. As another example, if a state of the client device indicates that the client device is in a sleep or locked state, then the type of notification may be an audible indication via speaker(s) and/or a vibration via the speaker(s) or other hardware components of the client device.

At block 270, the system determines whether any further user input is received at the client device associated with the given user within a threshold duration time. The further user input can be, for example further spoken input, further type input, and/or further touch input that is responsive to the notification requesting the information. In some implementations, the threshold duration of time can begin when the notification requesting the information is rendered at the client device of the given user. In other implementations, the threshold duration of time can begin when a last value is solicited by the additional user. If, at an iteration of block 270, the system determines further user input is received within the threshold duration of time, then the system may proceed to block 272. The further user input can be received responsive to the notification indicating the information being requested by the additional user, and can include an indication of the value(s) responsive to the request.

At block 272, the system completes, based on the value(s) for the candidate parameter(s) and/or the additional parameters, the at least one task. In implementations where the system determines that no additional value(s) are included in a request for information from the additional user at block 264 during the assisted call, the system can complete the at least one task using the corresponding value(s) for the candidate parameter(s) determined at block 260. In these implementations, the system can complete the assisted call without having to involve the given user of the client device. In implementation where the system determines that information associated with additional parameter(s) is requested by the additional user at block 264 during the assisted call, the system can complete the at least one task using the corresponding value(s) for the candidate parameter(s) determined at block 260 and the value(s) for the additional parameter(s) received at block 270. In these implementations, the system can complete the assisted call with minimal involvement from the given user of the client device. From block 272, the system may proceed to block 276, which is discussed in greater detail below.

Notably, although the system may determine that the additional user is requesting information that is not currently known to the system at block 264, the system can continue performance of the at least one task without the value(s) for the additional parameter(s). For instance, the system can cause synthesized speech to be provided as part of the assisted call, thereby causing it to be rendered at the additional client device of the additional user. Further, the synthesized speech can indicate the system does not currently know the value(s) for the additional parameter(s), but that the system can request value(s) associated with the information from the user and provide other value(s) for candidate parameter(s) determined at block 260 while the system solicits the value(s) for the additional parameter(s) from the given user of the client device. In this manner, the system can continue the dialog with the additional user to perform the task. Moreover, if further user input that includes the value(s) responsive to the request for the information from the additional user, then the system can provide the value(s) as a follow-up to providing of one of the known value(s) or as standalone value(s) when there is a break in the dialog. In this manner, the system can successfully perform the task on behalf of the given user of the client device in a quicker and more efficient manner since the dialog is not halted to wait for the value(s) for the additional parameter(s). By performing the task in a quicker and more efficient manner, both network and computational resources can be conserved since a length of the conversation can be reduced by using the techniques disclosed herein.

If, at an iteration of block 270, the system determines that no further user input is received within the threshold duration of time, then the system may proceed to block 274. At block 274, the system ends performance of the at least one task. Further, the system may end the ongoing call with the entity. By ending the ongoing call, as opposed to waiting for the further user input beyond the threshold duration of time, the dialog can also be concluded more quickly to achieve above mentioned technical advantages, even if the task cannot be fully performed. From block 274, the system may proceed to block 276.

At block 276, the system renders, via the client device, a notification indicating a result of the performance of the at least one task. In implementations where the system completes performance of the task from block 272, the notification can include an indication that the task was completed on behalf of the given user of the client device, and can include confirmation information related to completion of the task (e.g., date/time information, monetary cost associated with the task, a confirmation number, information associated with the entity, and/or other confirmation information). In implementations where the system ends performance of the task from block 274, the notification can include an indication that the task was not completed, and can include task information related to ending of the task (e.g., value(s) for particular parameter(s) needed, entity is unable to accommodate the corresponding value(s) determined at block 260 and/or the value(s) received at block 270, entity is closed, and/or other task information). In various implementations, the notification can include selectable graphical element(s) that, when selected, can cause the system to create a calendar entry based on a result of the task, create a reminder based on the result of the task, send messages that include the result of the task (e.g., text, SMS, email, and/or other messages), and/or other additional tasks responsive to a user selection thereof.

FIG. 3 depicts a flowchart illustrating example method 300 of assistive output during an ongoing non-assisted call, in accordance with various implementations. For convenience, the operations of method 300 are described with reference to a system that performs the operations. This system of method 300 includes one or more processors and/or other component(s) of computing device(s) (e.g., client device 110 of FIG. 1, client device 410 of FIGS. 4A-4D, client device 510 of FIGS. 5A-5C, computing device 610 of FIG. 6, one or more servers, and/or other computing devices). Moreover, while operations of method 300 are shown in a particular order, this is not meant to be limiting. One or more operations may be reordered, omitted, or added.

At block 352, the system detects, at a client device, an ongoing call between a given user associated with the client device and an additional user associated with an additional client device. The system can also optionally identify an entity associated with the additional user. The system can identify the entity based on metadata associated with the ongoing call. In some implementations, method 300 can include optional sub-block 352A. If included, at optional sub-block 352A, the system obtains consent, from an additional user associated with the entity, to monitor the ongoing call. The system can obtain consent from the additional user in the same manner described with respect to optional sub-block 260A of FIG. 2.

At block 354, the system processes a stream of audio data corresponding to the ongoing call to generate recognized text. The stream of audio data corresponding to the ongoing call can include at least additional spoken input of the additional user that is transmitted to the client device of the given user. The stream of audio data corresponding to the ongoing call can also include spoken input of the given user. Further, the system can process the stream of audio data, using speech recognition model(s) (e.g., speech recognition model(s) 120A of FIG. 1), to generate the recognized text. It should be understood that the system can continually process the stream of audio data corresponding to the ongoing call, assuming that the additional user consented to monitoring of the call.

At block 356, the system identifies, based on the recognized text, parameter(s) for at least one task to be performed by the given user during the ongoing call. The system can process the recognized text from block 354, using NLU model(s) (e.g., NLU model(s) 130A of FIG. 1), to determine intent(s) included in the stream of audio data. In some implementations, the system can determine that additional user input of the additional user includes a request for information for parameter(s) of at least one task. For example, if additional spoken input from the additional user of "do you have a quality assurance case number for this matter", the system can identify a quality assurance case number parameter, and can determine the user input includes a request for a value for the quality assurance case number parameter. In this example, the task can be any task associated with airlines entities and/or a specific task of providing a quality assurance case number without any regard to other parameter(s) that are associated with airlines entities.

At block 358, the system determines, for the parameter(s), corresponding value(s) to be used in performance of the at least one task. The corresponding value(s) can be determined subsequent to identifying the parameter(s) for the at least one task at block 356. In some implementations, the corresponding value(s) can be determined automatically responsive to identifying the parameter(s) for the at least one task based on user profiles(s) associated with the given user of the client device. For example, in response to identifying a quality assurance case number parameter, the system can access, with permission (e.g., prior permission) from the given user, an email account associated with the given user and search for emails that include a corresponding value for the quality assurance case number parameter. Moreover, in implementations where the entity engaged with the given user during the ongoing call is identified, the system can restrict the search to only emails associated with the identified entity. In other implementations, the corresponding value(s) can be determined responsive to receiving user input that includes information requesting the corresponding value(s) for the parameter(s), as opposed to being automatically identified. The corresponding value(s) can be determined responsive to receiving the user input in the same or similar manner described above.

In some implementations, method 300 can include optional blocks 360, 362, and/or 364. If included, at optional block 360, the system can determine whether any user input to activate assisted call is received at the client device associated with the given user. The system can determine whether user input activates assisted call based on spoken input, typed input, and/or touch input that invokes assisted call during the ongoing call between the given user of the client device and the additional user of the additional client device in any manner described herein. If, at an iteration of optional block 360, the system determines that user input to activate assisted call is received, then the system can proceed to block 366, which is discussed in greater detail below. If, at an iteration of optional block 360, the system determines that no user input to activate assisted call is received, then the system can proceed to optional block 362.

If included, at optional block 362, the system can render, via the client device associated with the given user, a notification indicating that assisted call is capable of performing the at least one task. The notification can include, for example, and an indication that the additional user is requesting information for corresponding value(s) determined at block 358 for the parameter(s) identified at block 356, and can also include an indication that the system is capable of providing the corresponding value(s) to the additional user on behalf of the given user. The notification can be rendered visually and/or audibly. In implementations where the notification is rendered audibly, the notification may be rendered audibly only at the client device, such that the additional user of the client device does not perceive the notification (i.e., outside of the call). Optionally, to mitigate the chances that the additional user will perceive the notification, the ongoing call can be temporarily muted during audible rendering of the notification, or acoustic echo cancellation or other filtering utilized to filter the notification and prevent it from being provided as part of the ongoing call. In other implementations where the notification is rendered audibly, the notification may be rendered audibly at both the client device of the given user and the additional client device of the additional user, such that the notification interrupts the ongoing call between the given user and the additional user.

If included, at optional block 364, the system can determine whether any user input to activate an assisted call is received at the client device associated with the given user. The user input received at block 364 can be responsive to rendering of the notification indicating that assisted call is capable of performing the at least one task. The system can determine whether user input activates assisted call based on spoken input, typed input, and/or touch input that invokes assisted call during the ongoing call between the given user of the client device and the additional user of the additional client device in any manner described herein. If, at an iteration of optional block 360, the system determines that no user input to activate assisted call is received, then the system can return to block 354 to process further audio data corresponding to the ongoing call. For example, the system may determine that the given user of the client device provided spoken input that includes the corresponding value(s) rendered in the notification at block 362, and the system can return to block 354 to continue processing the stream of audio data to monitor for any additional parameter(s) being requested by the additional user. If, at an iteration of optional block 364, the system determines that user input to activate the assisted call is received, then the system can proceed to block 366.

At block 366, the system causes the value(s) to be rendered, at the additional client device, for presentation to the additional user. The system can, in response to receiving the user input to activate the assisted call to provide the corresponding value(s) to the additional user, cause synthesized speech that includes the corresponding value(s) to be rendered at the additional client device of the additional user and/or the client device of the given user.

In implementations that include optional blocks 360, 362, and/or 364, the system can cause the corresponding value(s) to be rendered at the additional client device of the additional user and/or the client device of the given user in response to receiving explicit user input that invokes assisted call. In some versions of those implementations, the user input to activate the assisted call and interrupt the ongoing call can be proactive. In other words, if the system receives user input at block 360, the assisted call can be activated to provide the corresponding value(s) for the task even if the system has not rendered any notification indicating that the system is capable of performing the at least one task (e.g., as described with respect to FIG. 5A). In other versions of those implementations, the user input to activate the assisted call can be reactive. In other words, if the system receives user input at block 364, the assisted call can be activated to provide the corresponding value(s) for the task subsequent to rendering of the notification at block 362 indicating that the system is capable of performing the at least one task (e.g., as described with respect to FIG. 5B). In implementations that do not include optional blocks 360, 362, and/or 364, the system can proceed directly from block 368 to block 366. In some versions of those implementations, the system can interrupt the ongoing call automatically (i.e., without receiving any explicit user input to active assisted call) in response to determining the corresponding value(s) at block 358 (e.g., as described with respect to FIG. 5C).

At block 368, the system determines whether any user input to continue assisted call is received at the client device associated with the given user. If, at an iteration of block 368, the system determines that no user input to continue assisted call is received, then the system can return to block 354 to process further audio data corresponding to the ongoing call. If, at an iteration of block 368, the system determines that user input to continue assisted call is received, then the system can proceed to block 264 of FIG. 2 and determine whether any value(s) for additional parameter(s) are needed during the assisted call. In this manner, the system can provide corresponding value(s) for parameter(s) during performance of task(s) by a given user during a telephonic call. By providing the corresponding value(s), either automatically or in response to explicit user input as described above, the system receives fewer inputs from the given user of the client device since the user need not navigate to various applications having disparate user interfaces to determine the corresponding value(s), thereby conserving computational resources at the given client device. Moreover, the system conserves both computational and network resources by concluding the ongoing call more quickly, since the user need not navigate to these various applications. As one non-limiting example, by using the techniques described herein, the given user need not pause a dialog or put the dialog on hold while the user searches email applications, airline applications, and/or other applications for corresponding value(s).

Referring now to FIGS. 4A-4D, various non-limiting examples of user interfaces with respect to performing an assisted call are described. FIGS. 4A-4D each depict a client device 410 having a graphical user interface 480 displaying examples of interactions of a given user of the client device 410. The interactions can include, for example, interactions with one or more software applications (e.g., a web browser application, an automated assistant application, a contacts application, an e-mail application, a calendar application, and/or other software based applications accessible by the client device 410), and interactions with additional users (e.g., an additional human participant associated with an additional client device, an additional automated assistant associated with the additional client device of the additional user, and/or other additional users). One or more aspects of an automated assistant associated with client device 410 (e.g., automated assistant 115 of FIG. 1) may be implemented locally on the client device 410 and/or on other client device(s) that are in network communication with the client device 410 in a distributed manner (e.g., via network(s) 190 of FIG. 1). For the sake of simplicity, operations of FIGS. 4A-4D are described herein as being performed by the automated assistant. Although the client device 410 of FIGS. 4A-4D is depicted as a mobile phone, it should be understood that is not meant to be limiting. The client device 410 can be, for example, a stand-alone assistant device (e.g., with speaker(s) and/or a display), a laptop, a desktop computer, and/or any other client device capable of making telephonic calls.

The graphical user interface 480 of FIGS. 4A-4D further includes a textual reply interface element 484 that the user may select to generate user input via a virtual keyboard or other touch and/or typed input, and a voice reply interface element 485 that the user may select to generate user input via microphone(s) of the client device 410. In some implementations, the user may generate user input via the microphone(s) without selection of the voice reply interface element 485. For example, active monitoring for audible user input via the microphone(s) may occur to obviate the need for the user to select the voice reply interface element 485. In some of those and/or in other implementations, the voice reply interface element 485 may be omitted. Moreover, in some implementations, the textual reply interface element 484 may additionally and/or alternatively be omitted (e.g., the user may only provide audible user input). The graphical user interface 480 of FIGS. 4A-4D also includes system interface elements 481, 482, 483 that may be interacted with by the user to cause the computing device 410 to perform one or more actions.

Figure 4A:
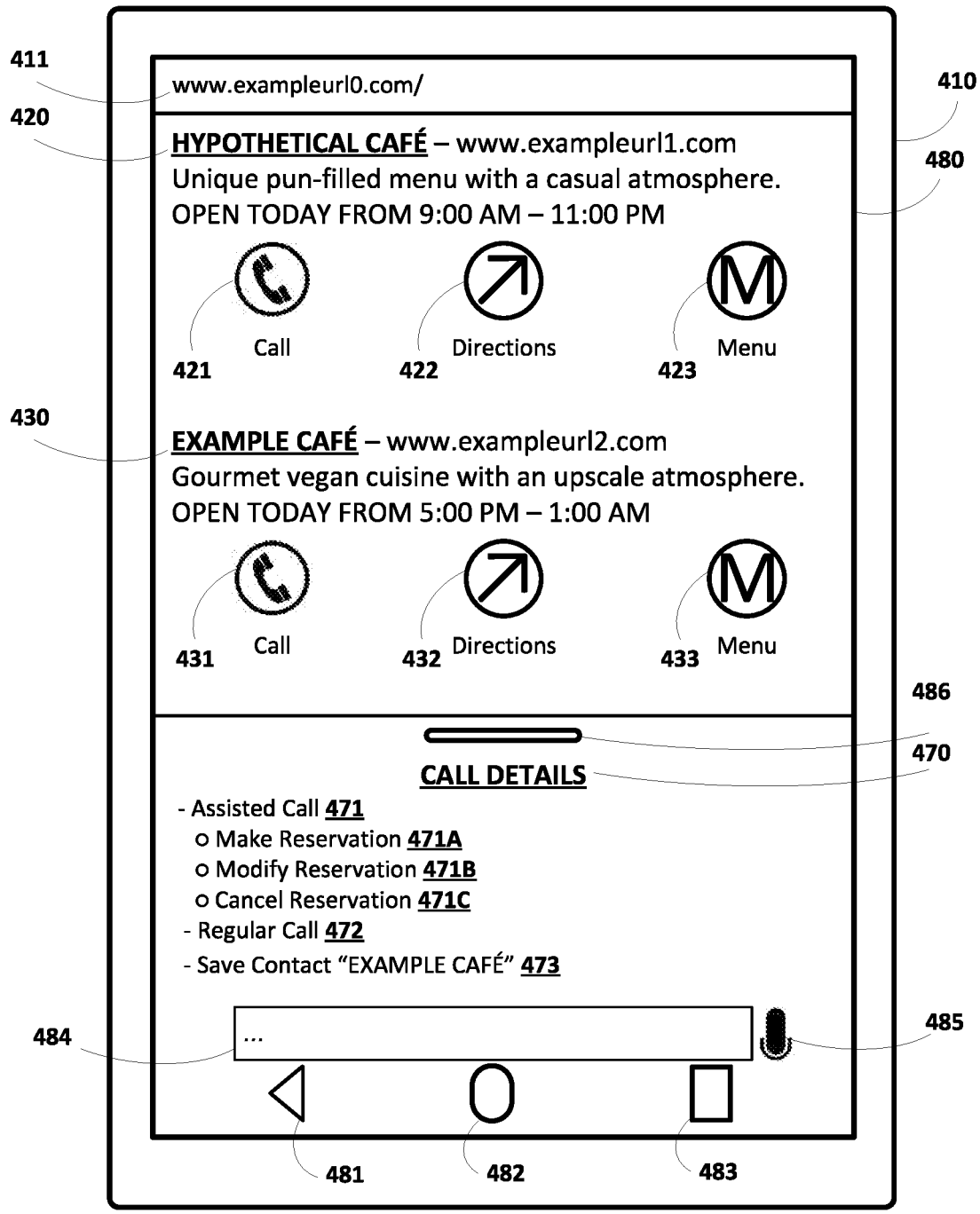
FIGS. 4A, 4B, 4C, and 4D depict various non-limiting examples of user interfaces with respect to performing an assisted call, in accordance with various implementations.

In various implementations described herein, user input can be received to initiate a telephonic call with an entity using an automated assistant (e.g., an assisted call). The user input can be spoken input, touch input, and/or typed input that includes an indication to initiate the assisted call. Further, the automated assistant can perform task(s), on behalf of a given user of the client device 410, with respect to the entity. As shown in FIG. 4A, the user interface 480 includes search results for restaurant entities from a browser application accessible at the client device 410 (e.g., as indicated by URL 411 of "www.exampleurl0.com/"). Further, the search results include a first search result 420 of "Hypothetical Café", and a second search result 430 of "Example Café".

In some implementations, the search results 420 and/or 430 can be associated with various selectable graphical elements that, when selected, cause the client device 410 to perform corresponding actions. For example, when a call graphical element 421 and/or 431 associated with a given one of the search results 420 and/or 430 is selected, the user input can indicate that a telephonic call action to the restaurant entity associated with the search results 420 and/or 430 should be performed. As another example, when a directions graphical element 422 and/or 432 associated with a given one of the search results 420 and/or 430 is selected, the user input can indicate that a navigation action to the restaurant entity associated with the search results 420 and/or 430 should be performed. As yet another example, when a menu graphical element 423 and/or 433 associated with a given one of the search results 420 and/or 430 is selected, the user input can indicate that a browser-based action to display the menu for the restaurant entity associated with the search results 420 and/or 430 should be performed. Although the assisted call is initiated from a browser application in FIG. 4A, it should be understood that is for the sake of example, and not meant to be limiting. For example, the assisted call can be initiated from various software applications accessible at the client device 410 (e.g., a contacts application, an email application, a text or SMS messaging application, and/or other software application), and, if the assisted call is initiated using spoken input, from a home screen of the client device 410, from a locked screen of the client device 410, and/or other states of the client device 410.

For the sake of example, assume user input is detected at the client device 410 to initiate a telephonic call with the second search result 430 of "Example Café". The user input can be, for example, spoken input of "call Example Café" or touch input directed to the call graphical element 431. In some implementations, a call details interface 470 can be rendered at the client device 410 responsive to receiving the user input to initiate a telephonic call with "Example Café". In some versions of those implementations, the call details interface 470 can be rendered at the client device 410 as part of the user interface 480. In some other versions of those implementations, the call details interface 470 can be a separate interface from the user interface 480 that overlays the user interface, and can include a call details interface element 486 that allows the user to expand the call details interface 470 to display additional call details (e.g., by swiping up on the call details interface element 486) and/or dismiss the call details interface 470 (e.g., by swiping down on the call details interface element 486. Although the call details interface 470 is depicted as being at the bottom of the user interface 480, it should be understood that is for the sake of example and not meant to be limiting. For example, the call details interface 470 can be rendered at a top of the user interface 480, a side of the user interface 480, or an entirely separate interface from the user interface 480.

The call details interface 470 can include, in various implementations, a plurality of graphical elements. In some implementations, the graphical elements can be selectable, such that, when a given one of the graphical elements is selected, the client device 410 can perform the corresponding action. As shown in FIG. 4A, the call details interface 470 includes a first graphical element 471 of "Assisted Call", a second graphical element 472 of "Regular Call", and a third graphical element 473 of "Save Contact 'Example Café'". Further, the first graphical element 471 can, when selected, provide the automated assistant an indication of a desire to initiate an assisted call using the automated assistant; the second graphical element 472 can, when selected, cause the automated assistant to initiate a call without using assisted call; and the third graphical element 473 can, when selected, cause the automated assistant to create a contact associated with Example Café. Notably, in some versions of those implementations, the graphical elements can include sub-elements to provide an indication of a task to be performed. For example, the first graphical element 471 of "Assisted Call" can include a first sub-element 471A of "Make Reservation" associated with a task of making a restaurant reservation at Example Café, a second sub-element 471B of "Modify Reservation" associated with a task of modifying a restaurant reservation at Example Café, and a third sub-element 471C of "Cancel Reservation" associated with a task of cancelling a restaurant reservation at Example Café.

Figure 4B:
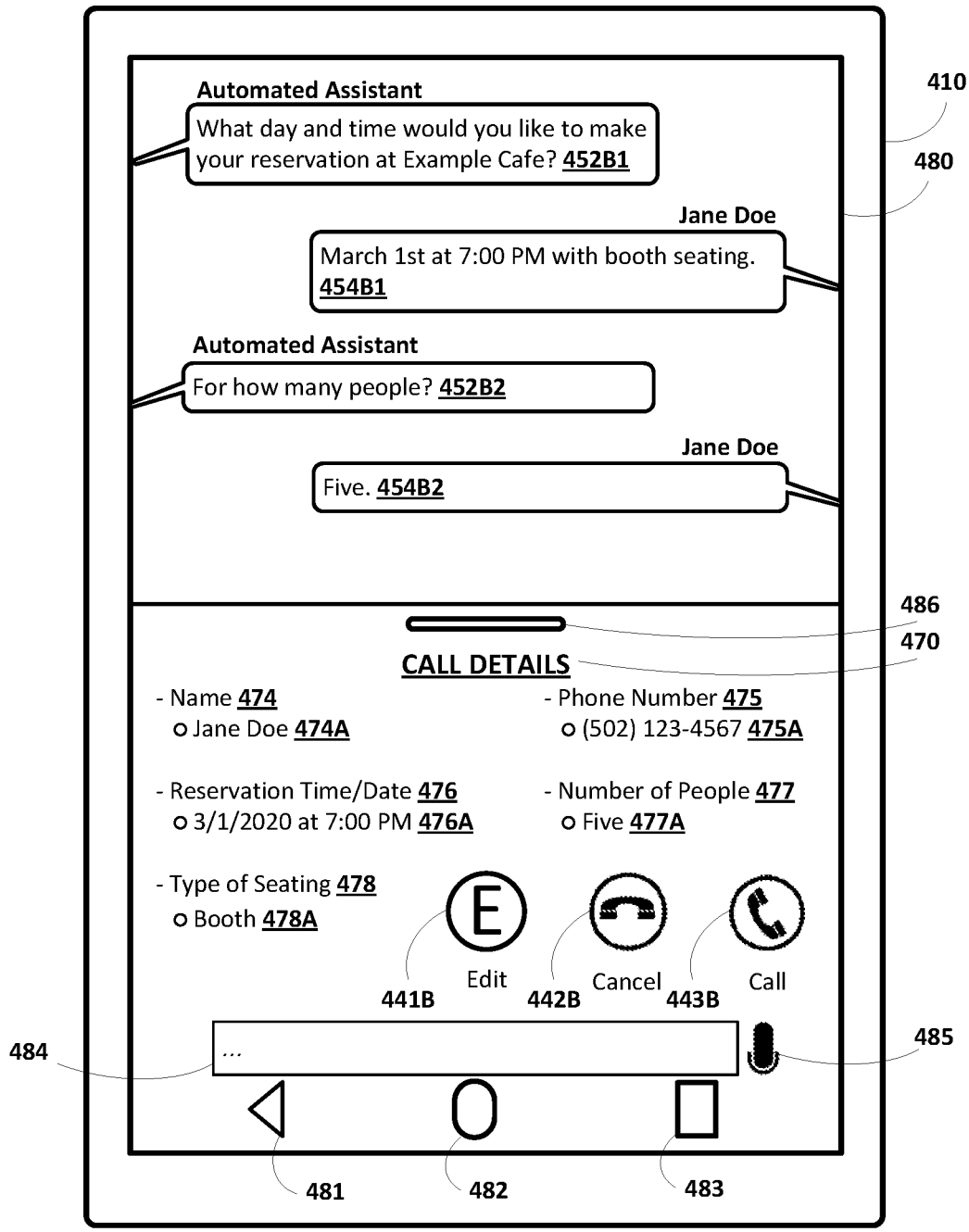

For the sake of example, assume user input is detected at the client device 410 to initiate an assisted call with Example Café to make a restaurant reservation at Example Café. The user input can be, for example, spoken input of "call Example Café to make a restaurant reservation" or touch input directed to the first sub-element 471A. In response to detecting the user input, the automated assistant can determine a task of "make a restaurant reservation at Example Café", and can identify candidate parameter(s) associated with the identified task as described herein (e.g., with respect to parameter(s) engine 153 of FIG. 1). In some implementations, and as shown in FIG. 4B, the automated assistant can determine value(s) for the candidate parameter(s). Notably, in going from FIG. 4A to FIG. 4B, the call details interface 470 can be updated to include the identified candidate parameter(s). In some versions of those implementations, the automated assistant can determine value(s) for candidate parameters based on user profile(s) associated with the given user of the client device 410. For example, the automated assistant can determine a value 474A (e.g., Jane Doe) for a name parameter 474, and a value 475A (e.g., (502) 123-4567) for a phone number parameter 475 without having to solicit the values 474A and 475A from the given user based on the automated assistant having access to the values 474A and 475A via the user profile(s) of the given user of the client device 410. Although FIG. 4B is described herein with respect to particular candidate parameter(s) identified by the automated assistant, it should be understood that is for the sake of example.

In some versions of those implementations, the automated assistant can engage in a dialog (e.g., audible and/or visual) with a given user of the client device 410 to solicit corresponding value(s) for the candidate parameter(s) that are not identified based on the user profile(s) of the given user of the client device 410. In some further versions of those implementations, the automated assistant may only solicit value(s) for candidate parameter(s) that are considered required parameter(s) as described herein (e.g., with respect to parameter(s) engine 153 of FIG. 1). For example, for a task of making a restaurant reservation, the automated assistant can generate a prompt 452B1 of "What day and time would you like to make your reservation at Example Café", and receive user input 454B1 (e.g., typed or spoken) of "March $1^{st}$ at 7:00 PM with booth seating." Accordingly, the call details interface 470 can be updated to include a value 476A (e.g., Mar. 1, 2020 at 7:00 PM) for a date/time parameter 476. Notably, the user input 454B1 also includes a value 478A of "booth seating" for a type of seating parameter 478 that was not solicited in the prompt 452B1. Even though the automated assistant did not request the value 478A in the prompt 452B1, the automated assistant can determine the value 478A corresponds to the type of seating parameter 478, which can be considered an optional parameter as described herein (e.g., with respect to parameter(s) engine 153 of FIG. 1). Further, the automated assistant can generate additional prompts (e.g., prompt 452B2) for additional parameters (e.g., a number of people parameter 477) to determine corresponding values (e.g., 477A with a value of five that is determined based on user input 454B2) for the additional parameters. In this manner, the automated assistant can determine value(s) for candidate parameter(s) to be used in performing the task on behalf of the given user of the client device 410 prior to initiating the assisted call.

Moreover, in various implementations when determining value(s) for candidate parameter(s), and as shown in FIG. 4B, the call details interface 470 can include various graphical elements. For example, the call details interface 470 can include an edit graphical element 441B that, when selected, allows the user to modify the value(s) 474A-478A prior to initiating the assisted call, a cancel graphical element 442B that, when selected, ends the assisted call and the user interface 480 can optionally return to the user interface 480 to a state prior to detecting the user input to initiate the assisted call (e.g., the user interface 480 of FIG. 4A), and a call interface element 443B that, when selected, allows the user to initiate a regular call without help of the automated assistant (e.g., similar to selection of the graphical element 472 of FIG. 4A).

Figure 4C:
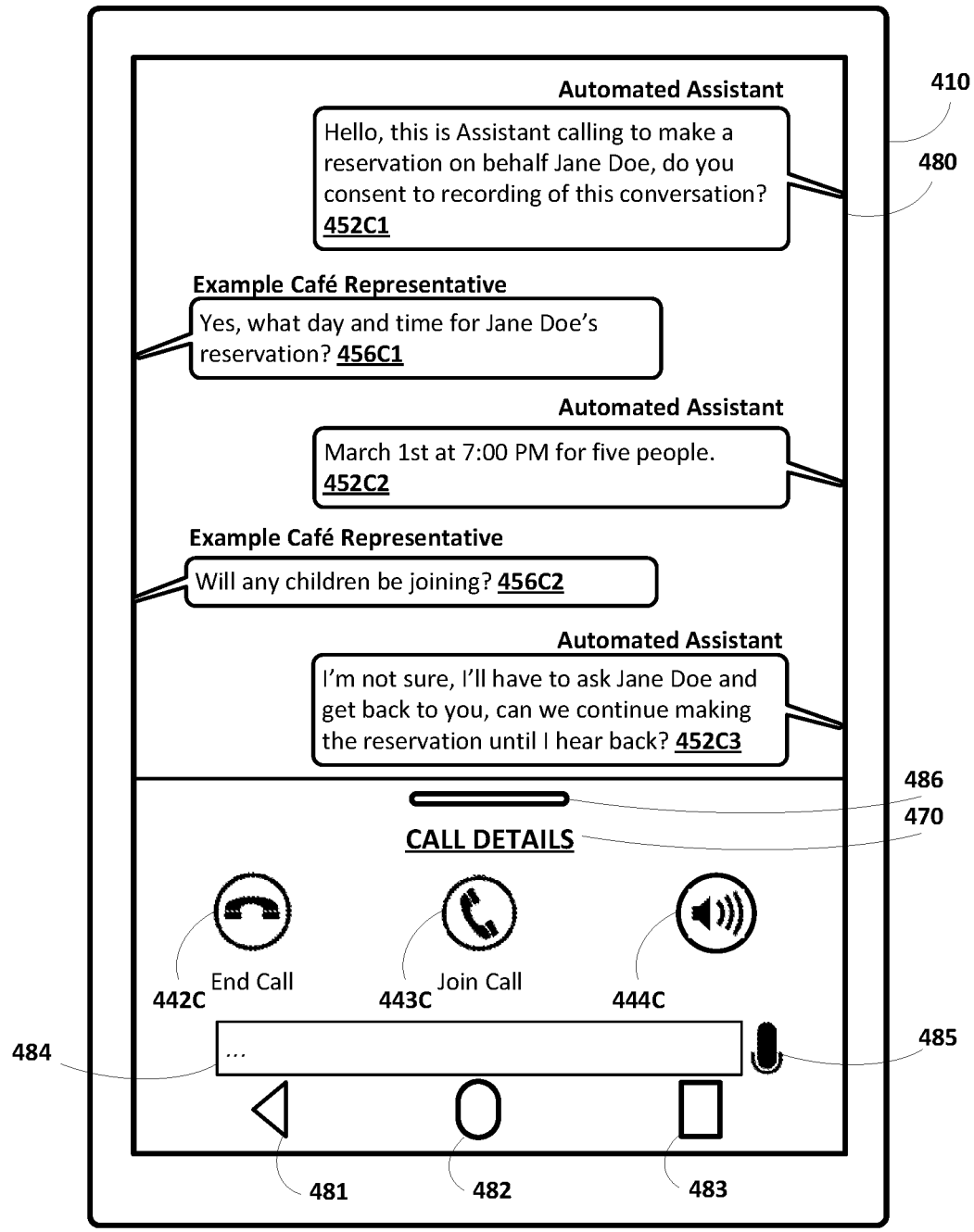

After determining the corresponding value(s) 474A-478A for the candidate parameter(s) 474-478, the automated assistant can initiate the assisted call to perform the task, on behalf of the given user of the client device 410, with respect to the entity. The automated assistant can initiate the assisted call using a call application accessible at the client device 410. In various implementations, and as shown in FIG. 4C, the call details interface 470 can be updated to include various graphical elements in response to the call being initiated by the automated assistant. For example, the call details interface 470 can include an end call graphical element 442C that, when selected, causes the automated assistant to end the assisted call after initiating the assisted call, a join call graphical element 443C that, when selected, allows the given user of the client device 410 to take over the call and/or performance of the task from the automated assistant, and a speaker interface element 444C that, when selected, causes the client device 410 to audibly render the dialog between the additional user and the automated assistant. These graphical elements 442C, 443C, and 444C can be selected throughout the duration of the assisted call.

Moreover, in various implementations, the automated assistant can obtain consent from an additional user of the client device after initiating the assisted call and prior to performing the task. As shown in FIG. 4C, the automated assistant can cause synthesized speech 452C1 to be rendered at an additional client device associated with Example Café Representative that requests the Example Café Representative provide consent for interacting with the automated assistant. The automated assistant can process audio data 456C1 corresponding to additional spoken input from the Example Café Representative to determine that consent was provided by the Example Café Representative (e.g., "yes" in the audio data456C1). Further, the automated assistant can cause further synthesized speech 452C2 that includes the value 476A for the date/time parameter 476 to be rendered at the additional client device of the Example Café Representative in response to determining the audio data 456C1 requests information for the value 476A for the date/time parameter 476. In this manner, the automated assistant can perform the task of making a restaurant reservation at Example Café by providing synthesized speech that includes value(s) responsive to requests for information from the Example Café Representative.

In some implementations, the automated assistant can process audio data corresponding to additional spoken input from the Example Café Representative, and can determine that the additional spoken input is requesting information for additional value(s) associated with parameter(s) that are not currently known to the automated assistant. As shown in FIG. 4C, audio data 456C2 captures additional spoken input requesting information for a children parameter that is not currently known to the automated assistant. In response to determining the additional spoken input from the Example Café Representative is requesting information that is not currently known to the automated assistant, the automated assistant can cause yet further synthesized speech to be rendered at the additional client device that indicates the information being requested is not currently known. Although the automated assistant may not currently know the information being requested, the automated assistant can continue performing the task with other value(s) that the automated assistant does currently know. For example, the automated assistant can cause yet further synthesized speech 452C3 of "I'm not sure, I'll have to ask Jane Doe and get back with you can we continue making the reservation until I hear back?" responsive to determining the audio data 456C2 requests information for additional value(s) associated with the parameter(s) not currently known to the automated assistant.

Figure 4D:
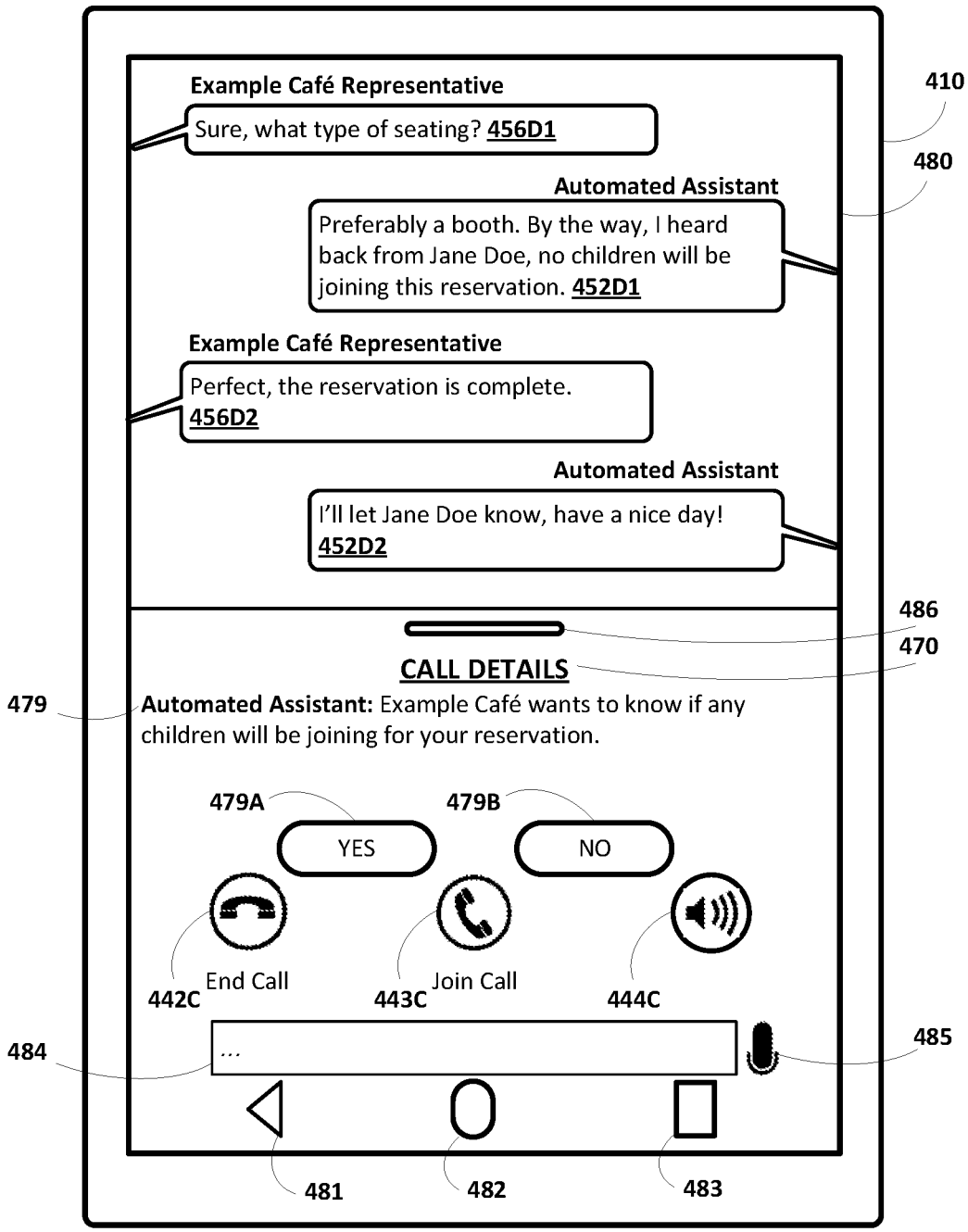

In some versions of those implementations, when the automated assistant determines audio data, of an additional user, includes a request for information, the automated assistant can cause a notification to be rendered at the client device 410 that indicates the additional user is requesting information associated with parameter(s) that the automated assistant does not currently know. In some further versions of those implementations, the notification can further include suggested values as recommendation(s) that are responsive to the request for the information. The recommendation(s) can be selectable, such that, upon selection of a given one of the recommendation(s), the automated assistant can utilize the value(s) included in the given one of the recommendation(s) as a value responsive to the additional user's request. For example, as shown in FIG. 4D, the automated assistant can cause notification 479 to be rendered visually in the call details interface 470. The notification 479 includes an indication that "Example Café want to know if any children will be joining the reservation", and also includes a first suggestion 479A of "yes" and a second suggestion 479B of "no" that are provided as recommended value(s) responsive to the additional user's request. As described in more detail below, various other types of notification can be rendered at the client device 410, and a type of the notification can be based on a state of the client device 410 when the system determines the audio data includes the request for the information that the automated assistant does not currently know.

As noted above, the automated assistant can continue performing the task with other value(s) that the automated assistant does currently know even if the automated assistant determines the additional user is requesting information that the automated assistant does not currently know. The additional value(s) can be provided later in the dialog subsequent to receiving further user input from the given user of the client device 410 responsive to the notification 479. For example, as depicted in FIG. 4D, in response to rendering the yet further synthesized speech 452C3 indicating a value for the children parameter is not currently known to the automated assistant, but that the automated assistant knows other value(s) and would like to continue performing the task using those other value(s). Further, assume audio data 456D1 of "sure, what type of seating?" is received (e.g., a request for information for the value 478A of "Booth" for the type of seating parameter 478). Further assume that a given user of the client device 410 provides spoken input and/or touch input directed to the second suggestion 479B to indicate that no children will be joining the restaurant reservation at Example Café while the audio data 456D1 is being processed by the automated assistant. In this example, the automated assistant can cause synthesized speech 452D1 that includes the value 478A of "Booth" for the type of seating parameter 478, and that includes the value (e.g., "no" based on the user selection of the second suggestion 479B) to be audibly rendered at the additional client device of the additional user. The automated assistant can process further audio data 456D2 of "Perfect, the reservation is complete" to determine the restaurant reservation task is completed, and can cause further synthesized speech 452D2 of "I'll let Jane Doe know, have a nice day!" and can end the call.

Notably, in some implementations, the automated assistant can include the additional value(s) (i.e., that were not previously known when requested by the additional user, but are now known based on the further user interface input) in synthesized speech that is responsive to a request from the additional user for other information. Put another way, the automated assistant can include the additional value(s) in synthesized speech even if the immediately preceding request from the additional user is not a request for the information. For example, and as depicted in FIG. 4D, the synthesized speech 452D1 includes the "Booth" value 478A that is responsive to the immediately preceding request for information associated with the type of seating parameter 478 included in the audio data 456D1, and the synthesized speech also includes the "no" value for the children parameter that is responsive to a previous request for information associated with the children parameter included in the audio data 456C2. In this manner, the automated assistant can continue performance of the task while waiting for the further user input that includes the additional value(s), and can provide the additional value(s) to the additional user when they become known to the automated assistant in a logical and conversational manner. By continuing performance of the task while waiting for the further user input, the task can be performed in a quicker and more efficient manner because performance of the task is not paused until the further user input is received. By performing the task in a quicker and more efficient manner, the techniques described herein can conserve computational and network resources in performing tasks using assisted call.

In various implementations, and although not depicted, the automated assistant may determine, during the assisted call, that no further audio data from the additional user associated with the entity is received within a threshold duration of time. In some versions of those implementations, the automated assistant can render yet further synthesized speech that is based on one or more corresponding values that have not been included in a request for information from the additional user. For example, if the automated assistant determines the additional user has not said anything for ten seconds and the automated assistant knows a value for a party size party for a restaurant reservation task that has not been requested by the additional user, then the assistant can render synthesized speech of "In case you wanted to know, five people will be joining the reservation." In some additional and/or alternative versions of those implementations, the automated assistant can render yet further synthesized speech that is based on one or more parameter(s) that have not been included in a request for information from the additional user. For example, if the automated assistant determines the additional user has not said anything for ten seconds and the automated assistant knows a value for a party size party for a restaurant reservation task that has not been requested by the additional user, then the assistant can render synthesized speech of "Do you want to know how many people will be joining the reservation?"

Moreover, in various implementations, the automated assistant can cause a transcript of various dialogs to be visually rendered at the user interface 480 of the client device 410. The transcript can be displayed, for example, at a home of the client device 410, at various software applications (e.g., an assistant application, a call application, and/or other applications). In some implementations, the transcript can include a dialog between the automated assistant and a given user of the client device 410 (e.g., as depicted in FIG. 4B). In some additional and/or alternative implementations, the transcript can include a dialog between the automated assistant and the additional user (e.g., as depicted in FIGS. 4C and 4D).

Although each of FIGS. 4B-4D are depicted as including transcripts of dialog, it should be noted that is for the sake of example and not meant to be limiting. It should be understood that the assisted call described above can be performed while the client device 410 is in a sleep state, a locked state, when other software application(s) are operating in the foreground, and/or in other states. Further, in implementations where the automated assistant causes notification(s) to be rendered at the client device 410, a type of the notification(s) rendered at the client device be based on a state of the client device 410 as described herein. Moreover, although FIGS. 4A-4D are described herein with respect to a task of making a restaurant reservation, it should be understood that is also not meant to be limiting, and that the techniques described herein can utilized for a plurality of different tasks that can be performed with respect to a plurality of different entities.

Further, in various implementations, the automated assistant may be placed on hold by the additional user at the beginning of the assisted call and/or during the assisted call. In some versions of those implementations, the automated assistant can be considered on hold when the automated assistant is not engaged in a conversation with an additional human participant. For example, the automated assistant can be considered on hold if the automated assistant is engaged by a hold system associated with the entity, an interactive voice response (IVR) system associated with the entity, and/or other systems associated with the entity. Further, the automated assistant can cause a notification to be rendered at the client device 410 when the assisted call is placed on hold and/or when the assisted is resumed after being placed on hold. The notification can indicate, for example, that the assisted call was placed on hold, that the assisted call has resumed after being placed on hold, that the user is requested to join the assisted call upon being resumed after being placed on hold, and/or other information related to the assisted call. Moreover, the automated assistant can determine that the assisted call has resumed after being placed on hold based on processing the stream of audio data transmitted to the client device 410 of the given user from the additional client device of the additional user.

In some versions of those implementations, the automated assistant can determine that the additional user has already requested all of the information associated with the parameter(s) that the automated assistant knows. In some further versions of those implementations, the automated assistant can proactively request that the given user of the client device 410 join the assisted call when the assisted call is resumed after being placed on hold if a remaining portion of the task requires the given user of the client device 410. For instance, certain tasks may require the given user of the client device 410 rather than the automated assistant. For example, assume that the entity is a bank, the additional user is a bank representative, and the task is disputing a debit card charge. In this example, the automated assistant can initially place the call with the bank, provide synthesized speech and/or emulated button presses such as synthesized speech that includes the given user's name, simulated button presses that include the user's bank account number, synthesized speech that provides a reason for the call, and/or simulated button presses to navigate through an automated system for routing calls associated with the bank (e.g., an IVR system). However, the automated assistant may know that the given user will be required to join the assisted call to verify the given user's identity and explain the disputed debit card charge when the assisted call is transferred to the bank representative, and can cause a notification to be rendered at the client device 410 of the user when the assisted call is transferred to the bank representative. Thus, the automated assistant can handle an initial part of the assisted call, and request that the given user of the client device 410 take over the assisted call when the bank representative is available to discuss the disputed charge.

In some other further versions of those implementations, the automated assistant can proactively request that the given user of the client device 410 join the assisted call when the assisted call is resumed after being placed on hold since the automated assistant does not know any further information with respect to the restaurant reservation. For example, assume that the additional user of the assisted call depicted in FIGS. 4B-4D placed the automated assistant on hold in the audio data 456D2 rather than indicate the restaurant reservation was complete. In this example, the automated assistant has already provided values for all of the information that is known to the automated assistant with respect to the restaurant reservation, and any further information requested by the additional user when the assisted call is resumed will be information that is not currently known to the automated assistant. Accordingly, the automated assistant can proactively request that the given user of the client device 410 take over the assisted call when it is resumed.

In yet other further versions of those implementations, the automated assistant can withhold the notification that indicates the assisted call was placed on hold and/or that the assisted call has resumed after being placed on hold, continue the assisted call once the assisted call has resumed after being placed on hold, and cause the notification to be rendered at the client device 410 of the given user along with, or lieu of, a notification that indicates the additional user is requesting information associated with parameter(s) that the automated assistant does not currently know (e.g., notification 479 of FIG. 4D). Continuing with the above example, rather than proactively requesting that the given user of the client device 410 take over the assisted call when it is resumed, the automated assistant can process further audio data corresponding to further spoken input of the additional user to determine whether the additional user is requesting further information associated with parameter(s) that the automated assistant does not currently know. In this example, the automated assistant can provide a notification requesting that the given user of the client device 410 take over the assisted call, along with, or in lieu of, a notification similar to notification 479 of FIG. 4D and that requests values for the further information. In this manner, the automated assistant can continue the assisted call as described in FIGS. 4B-4D and/or pass control of the assisted call to the given user of the client device 410.

Referring now to FIGS. 5A-5C, various non-limiting examples of user interfaces with respect providing assistive output during an ongoing non-assisted call are described. FIGS. 5A-5C each depict a client device 510 having a graphical user interface 580 displaying examples of interactions of a given user of the client device 510. The interactions can include, for example, interactions with one or more software applications (e.g., a web browser application, an automated assistant application, a contacts application, an e-mail application, a calendar application, and/or other software based applications accessible by the client device 510), and interactions with additional users (e.g., an automated assistant associated with client device 510, an additional human participant associated with an additional client device, an additional automated assistant associated with the additional client device of the additional user, and/or other additional users). One or more aspects of an automated assistant associated with client device 510 (e.g., automated assistant 115 of FIG. 1) may be implemented locally on the client device 510 and/or on other client device(s) that are in network communication with the client device 510 in a distributed manner (e.g., via network(s) 190 of FIG. 1). For the sake of simplicity, operations of FIGS. 5A-5C are described herein as being performed by the automated assistant. Although the client device 510 of FIGS. 5A-5C is depicted as a mobile phone, it should be understood that is not meant to be limiting. The client device 510 can be, for example, a stand-alone speaker, a speaker connected to a graphical user interface, a laptop, a desktop computer, and/or any other client device capable of making telephonic calls.

The graphical user interface 580 of FIGS. 5A-5C further includes a textual reply interface element 584 that the user may select to generate user input via a virtual keyboard or other touch and/or typed input, and a voice reply interface element 585 that the user may select to generate user input via microphone(s) of the client device 510. In some implementations, the user may generate user input via the microphone(s) without selection of the voice reply interface element 585. For example, active monitoring for audible user input via the microphone(s) may occur to obviate the need for the user to select the voice reply interface element 585. In some of those and/or in other implementations, the voice reply interface element 585 may be omitted. Moreover, in some implementations, the textual reply interface element 584 may additionally and/or alternatively be omitted (e.g., the user may only provide audible user interface input). The graphical user interface 580 of FIGS. 5A-5C also includes system interface elements 581, 582, 583 that may be interacted with by the user to cause the computing device 510 to perform one or more actions. In some implementations, a call details interface 570 can be rendered at the client device 510, and the call details interface 510 can include graphical element 542 that, when selected, can cause the ongoing call to be ended, and can also include graphical element 543 that, when selected, can cause the automated assistant to take over the call from the given user of the client device 510 using assisted call. In some versions of those implementations, the assisted call interface 570 can also include a call details interface element 586 that allows the user to expand the call details interface 570 to display additional call details (e.g., by swiping up on the call details interface element 586) and/or dismiss the call details interface 570 (e.g., by swiping down on the call details interface element 586).

In various implementations, the automated assistant can interrupt an ongoing call (i.e., not an assisted call) between a given user of the client device 410 and an additional user of an additional client device. In some implementations, the automated assistant can process audio data corresponding to the ongoing call to identify an entity associated with the additional user, task(s) to be performed during the ongoing call, and/or parameter(s) for the task(s) to be performed during the ongoing call. Further, the automated assistant can determine value(s) for the identified parameter(s). For example, as depicted in FIGS. 5A-5C, assume audio data 552A1, 552B1, and/or 552C1 that captures spoken input of "Example Airlines representative, how may I help you?" from an additional user is received at the client device 510. In this example, the automated assistant can process the audio data 552A1, 552B1, and/or 552C1, and can determine the additional user is Example Airlines Representative and/or identify Example Airlines as the entity associated with the Example Airlines Representative, based on the processing. In some additional and/or alternative implementations, the automated assistant can additionally and/or alternatively identify the entity based on metadata associated with the ongoing call as described herein (e.g., with respect to the assisted call engine 150 of FIG. 1). In some versions of those implementations, the automated assistant may not process the stream of the audio data corresponding to the ongoing call, and identify the entity only based on the metadata associated with the ongoing call, thereby obviating the need to obtain consent from the additional user of the ongoing call. As described below, the automated assistant can still perform task(s) on behalf of the given user of the client device 510 without processing the stream of the audio data corresponding to the ongoing call.

Further assume audio data 554A1, 554B1, and/or 554C1 that captures spoken input of "Hello, I need to change my flight" from a given user of the client device 510 (e.g., Jane Doe) is detected at the client device 510 and transmitted to the additional client device of the additional user. In this example, the automated assistant can process the audio data 554A1, 554B1, and/or 554C1, and can determine a task of changing a flight based on the processing. In other examples, the automated assistant can additionally and/or alternatively determine the task(s) associated with the entity as described herein (e.g., with respect to the assisted call engine 150 of FIG. 1). Further assume audio data 552A2, 552B2, and/or 552C2 that captures spoken input of "Alright, do you have a frequent flier number?" from the additional user is received at the client device 510. In this example, the automated assistant can process the audio data 552A2, 552B2, and/or 552C2, and can identify a frequent flier number parameter, for the task of changing a flight (or consider the task providing of the frequent flier number), based on the processing. In other examples, the automated assistant can additionally and/or alternatively identify the parameter(s) based on the parameter(s) being stored in association with the task and/or the entity as described herein (e.g., with respect to the assisted call engine 150 of FIG. 1). Further, the automated assistant can determine a value for the frequent flier number parameter, and can provide the value for the frequent flier number parameter to the additional user.

In some implementations, the automated assistant can determine the value(s) for the parameter(s) identified during an ongoing call, between the given user of the client device 510 and the additional user, in response to receiving user input, from a given user of the client device 510, that includes a request for the information associated with the parameter(s). The automated assistant can determine the value(s) for the parameter(s) based on user profile(s) associated with the given user of the client device 510 (e.g., stored in user profiled(s) database 153B of FIG. 1). In some versions of those implementations, the automated assistant can cause the value(s) for the parameter(s) to be rendered at the additional client device of the additional user and/or the client device 510 of the given user in response to determining the value(s) for the parameter(s). For example, as shown in FIG. 5A, assume audio data 554A2 that captures spoken input of "Assistant, what's my frequent flier number?" from the given user of the client device 510 (e.g., Jane Doe) is detected at the client device 510. In response to receiving the spoken input captured in the audio data 554A2, the automated assistant can determine the value for the frequent flier parameter (e.g., based on an Example Airlines account associated with the given user being included in the user profile(s)), and can cause synthesized speech 556A1 of "Jane Doe's Example Airlines frequent flier number is: 0112358" to be rendered at the additional client device of the additional user and/or the client device 510 of the given user.

In some additional and/or alternative versions of those implementations, rather than receiving the spoken input included in the audio data 554A2, the automated assistant can receive a selection of graphical element 543 to take over the call from the given user of the client device 510 using assisted call. For example, responsive to receiving the selection of the graphical element 543, the automated assistant can determine the value for the frequent flier parameter (e.g., based on an Example Airlines account associated with the given user being included in the user profile(s)), and can cause the synthesized speech 556A1 to be rendered at the additional client device of the additional user and/or the client device 510 of the given user. Further, the Example Airlines Representative can acknowledge receipt of the synthesized speech 556A1 (e.g., as indicated by 552A3).

Notably, the audio data 554A2 includes "what's my frequent flier number" without identifying an entity associated with the frequent flier number. In implementations where the automated assistant does not obtain consent from the additional user and/or provide an indication of the entity associated with the frequent flier number parameter, the automated assistant can determine that "my frequent flier number" references a value for frequent flier number parameter associated with Example Airlines based on metadata associated with the ongoing call. In this manner, the automated assistant can still provide the value(s) responsive to the request from the given user of the client device 510 without processing the stream of the audio data corresponding to the ongoing call.

In other implementations, the automated assistant can proactively determine the value(s) for the parameter(s) identified during an ongoing call, between the given user of the client device 510 and the additional user, without receiving any user input, from a given user of the client device 510, that includes a request for the information associated with the parameter(s). The automated assistant can determine the value(s) for the parameter(s) based on user profile(s) associated with the given user of the client device 510 (e.g., stored in user profiled(s) database 153B of FIG. 1).

In some versions of those implementations, the automated assistant can cause a notification to be rendered at the client device 510 that includes an indication that assisted callis capable of performing the task and/or capable of providing the value(s) for the parameter(s) to the additional user. The automated assistance can cause synthesized speech that includes the value(s) to be rendered at the additional client device of the additional user responsive to receiving user input, from the given user of the client device 510, that invokes assisted speech. For example, as shown in FIG. 5B, assume the automated assistant determines the value for the frequent flier number parameter responsive to identifying a request for the value for the frequent flier number parameter in the audio data 552B2. Further assume the automated assistant causes a notification 579 of "Your Example Airlines frequent flier number is 0112358, would you like me to provide it to Example Airlines Representative?" is rendered in the call details interface 570 of the client device 510. The automated assistant can then cause synthesized speech 556B1 of "Jane Doe's Example Airlines frequent flier number is: 0112358" to be rendered at the additional client device of the additional user and/or the client device 510 of the given user in response to receiving a selection of graphical element 579A and/or graphical element 543 that indicates the automated assistant should provide the value for the frequent flier number parameter to the additional user. However, the automated assistant may refrain from providing the value for the frequent flier number parameter to the additional user in response to receiving a selection of graphical element 579B. In some additional and/or alternative implementations, the automated assistant can detect spoken input of the given user of the client device 510 that includes the value(s) for the parameter(s) identified during the ongoing dialog. In some versions of those implementations, the automated assistant can automatically dismiss the notification 579 included in the call details interface 579.

In some other versions of those implementations, the automated assistant can also proactively provide the value(s) for the parameter(s) identified during the ongoing call, in response to determining value(s) for the parameter(s), and without receiving any user input that includes a request for the information associated with the parameter(s). The automated assistance can cause synthesized speech that includes the value(s) to be rendered at the additional client device of the additional user responsive to determining the value(s). For example, as shown in FIG. 5C, assume the automated assistant determines the value for the frequent flier number parameter responsive to identifying the request, from the additional user, for the value for the frequent flier number parameter in the audio data 552C2. The automated assistant can then cause synthesized speech 556C1 of "Jane Doe's Example Airlines frequent flier number is: 0112358" to be rendered at the additional client device of the additional user and/or the client device 510 of the given user in response to determining the value for the frequent flier number parameter, and without receiving any user input that includes a request for the information associated with the frequent flier number parameter. Further, the Example Airlines Representative can acknowledge receipt of the synthesized speech 556C1 (e.g., as indicated by 552C3). In some further versions of those implementations, the automated assistant may only proactively provide the value(s) for the parameter(s) identified during the ongoing call if a confidence metric associated with the determined value(s) for the parameter(s) satisfy a confidence threshold. The confidence metric can be based on, for example, whether the given user previously provided the determined value in response to receiving a prior request for the same information, whether the parameter(s) identified during the ongoing call are candidate parameter(s) stored in association with the task identified during the ongoing call, a source from which the value is determined (e.g., an email/calendar application vs. a text messaging application), and/or manners of determining a confidence metric.

Moreover, in various implementations, subsequent to the automated assistant providing the value(s) for the identified parameter(s) during the ongoing call, the automated assistant can take over the remainder of the ongoing call. In some versions of those implementations, the automated assistant can take over the remainder of the ongoing call in response to a user selection of the graphical element 543. Thus, the automated assistant can continue identifying parameter(s) for the task based on audio data transmitted to the client device 510, and determining value(s) for the identified parameter(s). Further, if the automated assistant determines a given request is for information that cannot be determined by the automated assistant, then the automated assistant can provide a notification that solicits further user input responsive to the request, and the automated assistant can then provide a value, based on the further user input responsive to the request, as described above (e.g., with respect to FIGS. 4C and 4D).

Although FIGS. 5A-5C are described herein with respect to a task of providing a frequent flier number, it should be understood that is not meant to be limiting, and the techniques described herein can utilized for a plurality of different tasks that can be performed with respect to a plurality of different entities. Moreover, although not depicted in FIGS. 5A-5C, it should be understood that the automated assistant can obtain consent from the additional user upon the ongoing call being initiated even if the ongoing call is not initiated by the automated assistant using assisted call. The automated assistant can obtain consent from the additional user using any manner described herein.

Figure 6:
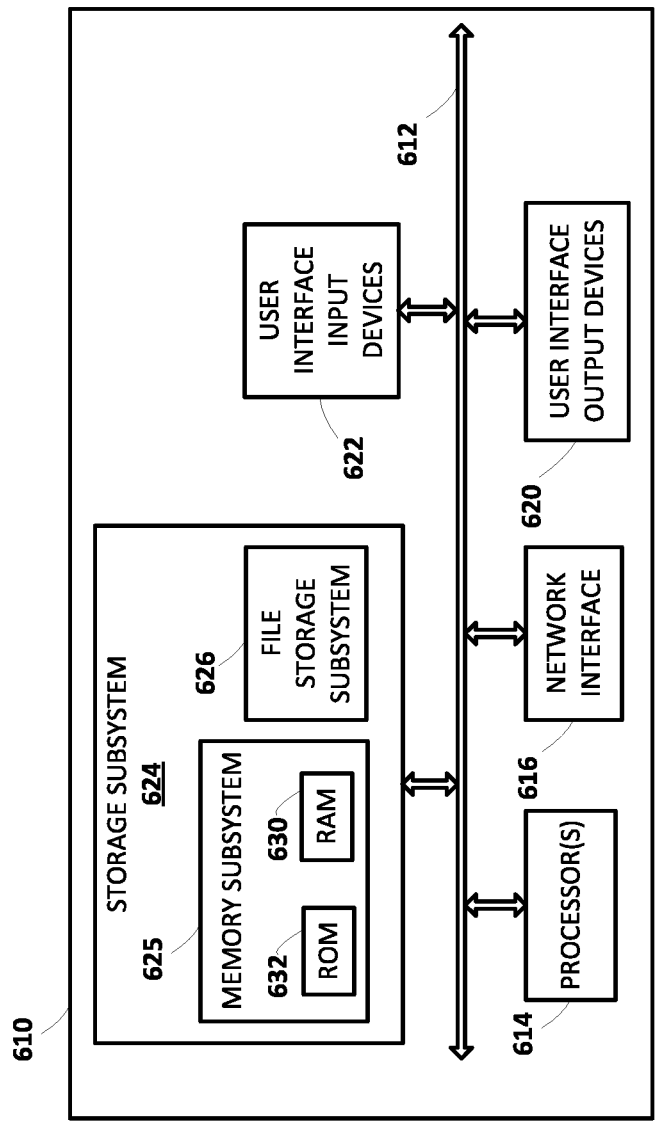
FIG. 6 depicts an example architecture of a computing device, in accordance with various implementations.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, from a given user via a client device associated with the given user, user input to initiate an assisted call, and determining, based on the user input: an entity to engage with, on behalf of the given user, during the assisted call, and a task to be performed, on behalf of the given user, during the assisted call. The method further includes determining, for one or more candidate parameters stored in association with the task and/or the entity, one or more corresponding values to be used in automatically generating synthesized speech, during the assisted call, in performing the task, initiating, using the client device associated with given user, performing of the assisted call, and determining, during the performing of the assisted call and based on processing audio data, of the assisted call, that captures an utterance of an additional user associated with the entity, that information associated with an additional parameter is requested by the additional user. The method further includes, in response to determining that the information associated with the additional parameter is requested, causing the client device to render, outside of the assisted call, a notification that identifies the additional parameter, and that requests further user input for the information. The method further includes prior to receiving any further input that is responsive to the notification, continuing the assisted call. Continuing the assisted call includes rendering one or more instances of synthesized speech that are based on one or more of the corresponding values for the candidate parameters. The method further includes, determining, during continuing the assisted call, whether further user input, that is responsive to the notification and that identifies a particular value for the additional parameter, is received within a threshold duration of time, and, in response to determining the further user input is received within the threshold duration of time, rendering further synthesized speech, as part of the assisted call, that is based on the particular value.

These and other implementations of technology disclosed herein can optionally include one or more of the following features.

In some implementations, determining a given value, of the corresponding values, includes, prior to initiating the assisted call, generating a prompt that identifies a given candidate parameter of the candidate parameters, and that requests additional information associated with the given candidate parameter, causing the client device to render the prompt, and identifying, based on additional user input that is responsive to the prompt, the given value for the given candidate parameter.

In some implementations, determining a further value, of the corresponding values, includes, prior to initiating the assisted call, identifying the further value based on a user profile associated with the given user.

In some implementations, continuing the assisted call includes processing additional audio data, of the assisted call, to determine that an additional utterance, of the additional user, includes a request for a given candidate parameter of the candidate parameters, and, in response to determining that the additional utterance includes the request for the given candidate parameter, causing the client device to render, on the call, a given instance, of the one or more instances of synthesized speech. In some versions of those implementations, the given instance includes a given value, of the corresponding values, based on the given value being determined for the given candidate parameter, and the given instance is rendered without requesting any additional user input from the given user.

In some implementations, continuing the assisted call includes processing further audio data to determine whether a further utterance of the additional user is received within an additional threshold duration of time, and, in response to determining that no further utterance is received from the additional user within the additional threshold duration of time, rendering, during the assisted call, another instance, of the one or more instances of synthesized speech, that is based on one or more of the corresponding values that has not been requested by the additional user.

In some implementations, the method further includes, in response to determining the information associated with the additional parameter is requested by the additional user, updating the one or more candidate parameters stored in association with the entity to include the additional parameter.

In some implementations, the method further includes determining a state of the client device when the information associated with the additional parameter is requested by the additional user, and determining, based on the state of the client device, the notification and/or one or more properties for rendering the notification.

In some versions of those implementations, the state of the client device indicates the given user is actively monitoring the assisted call, and determining, based on the state of the client device, the notification, includes determining, based on the state of the client device indicates the given user is actively monitoring the assisted call, the notification to include a visual component that is visually rendered, via a display of the client device, along with one or more selectable graphical elements. In some further versions of those implementations, the further user input, responsive to the notification, includes a selection of a given one of the one or more selectable graphical elements.

In some versions of those implementations, the state of the client device indicates the given user is not actively monitoring the assisted call, and determining, based on the state of the client device, the notification, includes determining, based on the state of the client device indicates the given user is actively monitoring the assisted call, the notification to include an audible component that is audibly rendered via one or more speakers of the client device.

In some implementations, the method further includes terminating the assisted call, and, subsequent to terminating the assisted call, causing the client device to render an additional notification that includes an indication of a result of the assisted call. In some versions of those implementations, the additional notification that includes the indication of the assisted call: includes an indication of an additional task performed, on behalf of the user, in response to terminating the assisted call, or includes one or more selectable graphical elements that, upon selection, cause the client device to perform an additional task on behalf of the user.

In some implementations, the method further includes, in response to determining the further user input is not received within the threshold duration of time, terminating the assisted call, and, subsequent to terminating the assisted call, causing the client device to render an additional notification that includes an indication of a result of the assisted call.

In some implementations, the threshold duration of time is: a fixed duration from when the notification that identifies the additional parameter, and that requests further user input for the information is rendered, or a dynamic duration that is based on when a last one of one or more of the corresponding values is rendered for presentation to the additional user via the additional client device.

In some implementations, the method further includes, subsequent to initiating the assisted call, obtaining, from the additional user associated with the entity, consent to monitor the assisted call.

In some implementations, a method implemented by one or more processors is provided, and includes detecting, at a client device, an ongoing call between a given user of the client device and an additional user of an additional client device, processing a stream of audio data, that captures at least one spoken utterance during the ongoing call, to generate recognized text. The at least one spoken utterance is of the given user or the additional user. The method further includes identifying, based on processing the recognized text, that the at least one spoken utterance requests information for a parameter, and determining, for the parameter and using access-restricted data that is personal to the given user, that a value, for the parameter, is resolvable. The method further includes, in response to determining that the value is resolvable, rendering, during the ongoing call, output that is based on the value.

These and other implementations of technology disclosed herein can optionally include one or more of the following features.

In some implementations, the method further includes resolving the value for the parameter. In some versions of those implementations, rendering the output, during the ongoing call, is further in response to resolving the value for the parameter. In some further versions of those implementations, resolving the value for the parameter includes analyzing metadata of the ongoing call between the given user and the additional user, identifying, based on the analyzing, an entity associated with the additional user, and resolving the value based on the value being stored in association with the entity and the parameter.

In some implementations, the output includes synthesized speech and rendering the output, during the ongoing call, that is based on the value includes rendering the synthesized speech as part of the ongoing call. In some versions of those implementations, the method further includes, prior to rendering the synthesized speech as part of the ongoing call, receiving, from the given user, user input to activate assistance during the ongoing cal. In some versions of those implementations, rendering the synthesized speech as part of the ongoing call is further in response to receiving the user input to activate the assistance.

In some implementations, the output includes a notification that is rendered at the client device and outside of the ongoing call. In some versions of those implementations, the output further includes synthesized speech that is rendered as part of the ongoing call, and the method further includes rendering the synthesized speech subsequent to rendering the notification and responsive to receiving affirmative user input in response to the notification.

In some implementations, the method further includes determining, based on processing the stream of audio data for a threshold duration after the at least one spoken utterance that requests information for the parameter, whether any additional spoken utterance, of the given user and received within the threshold duration, includes the value. In some versions of those implementations, providing the output is contingent on determining that no additional spoken utterance, of the given user and received within the threshold duration, includes the value.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   receiving, from a given user via a client device associated with the given user, user input to initiate an assisted call;
   determining, based on the user input:
     an entity to engage with, on behalf of the given user, during the assisted call, and
     a task to be performed, on behalf of the given user, during the assisted call;
   determining, for one or more candidate parameters stored in association with the task and/or the entity, and based at least in part on a dialog with the given user, one or more corresponding values to be used in automatically generating synthesized speech, during the assisted call, in performing the task;
   initiating, using the client device associated with given user, performing of the assisted call;
   determining, during the performing of the assisted call and based on processing audio data, of the assisted call, that captures an utterance of an additional user associated with the entity, that a particular value, associated with an additional parameter and which was not previously determined during the dialog with the given user, is requested by the additional user; and
   in response to determining that the particular value associated with the additional parameter is requested:
     causing the client device to render, outside of the assisted call, a notification that identifies the additional parameter, and that requests further user input for the particular value;
     prior to receiving any further input that is responsive to the notification, continuing the assisted call, wherein continuing the assisted call comprises rendering one or more instances of synthesized speech, as part of the assistant call and for presentation to the additional user, that are based on one or more of the corresponding values for the candidate parameters that were previously determined during the dialog with the given user but have not yet been provided to the additional user during the assisted call;

determining, during continuing the assisted call, whether further user input, that is responsive to the notification and that identifies the particular value for the additional parameter, is received within a threshold duration of time; and
in response to determining the further user input is received within the threshold duration of time:
rendering further synthesized speech, as part of the assisted call, that is based on the particular value.

2. The method of claim 1, wherein determining a given value, of the corresponding values, and based on the dialog with the given user, comprises:
prior to initiating the assisted call:
generating a prompt that identifies a given candidate parameter of the candidate parameters, and that requests additional information associated with the given candidate parameter;
causing the client device to render the prompt; and
identifying, based on additional user input that is responsive to the prompt, the given value for the given candidate parameter.

3. The method of claim 2, wherein determining a further value, of the corresponding values, comprises:
prior to initiating the assisted call:
identifying the further value based on a user profile associated with the given user.

4. The method of claim 1, wherein continuing the assisted call comprises:
processing additional audio data, of the assisted call, to determine that an additional utterance, of the additional user, includes a request for a given candidate parameter of the candidate parameters; and
in response to determining that the additional utterance includes the request for the given candidate parameter:
causing the client device to render, during the assisted call, a given instance, of the one or more instances of synthesized speech,
wherein the given instance includes a given value, of the corresponding values, based on the given value being determined for the given candidate parameter, and
wherein the given instance is rendered without requesting any additional user input from the given user.

5. The method of claim 1, wherein continuing the assisted call comprises:
processing further audio data to determine whether a further utterance of the additional user is received within an additional threshold duration of time; and
in response to determining that no further utterance is received from the additional user within the additional threshold duration of time:
rendering, during the assisted call, another instance, of the one or more instances of synthesized speech, that is based on one or more of the corresponding values that has not been requested by the additional user.

6. The method of claim 1, further comprising:
in response to determining the information associated with the additional parameter is requested by the additional user:
updating the one or more candidate parameters stored in association with the entity to include the additional parameter.

7. The method of claim 1, further comprising:
determining a state of the client device when the information associated with the additional parameter is requested by the additional user, and
determining, based on the state of the client device, the notification and/or one or more properties for rendering the notification.

8. The method of claim 7, wherein the state of the client device indicates the given user is actively monitoring the assisted call, and wherein determining, based on the state of the client device, the notification, comprises:
determining, based on the state of the client device indicating the given user is actively monitoring the assisted call, the notification to include a visual component that is visually rendered, via a display of the client device, along with one or more selectable graphical elements, and
wherein the further user input, responsive to the notification, comprises a selection of a given one of the one or more selectable graphical elements.

9. The method of claim 7, wherein the state of the client device indicates the given user is not actively monitoring the assisted call, and wherein determining, based on the state of the client device, the notification, comprises:
determining, based on the state of the client device indicating the given user is not actively monitoring the assisted call, the notification to include an audible component that is audibly rendered via one or more speakers of the client device.

10. The method of claim 1, further comprising:
terminating the assisted call; and
subsequent to terminating the assisted call:
causing the client device to render an additional notification that includes an indication of a result of the assisted call.

11. The method of claim 10, wherein the additional notification that includes the indication of the assisted call:
includes an indication of an additional task performed, on behalf of the user, in response to terminating the assisted call, or
includes one or more selectable graphical elements that, upon selection, cause the client device to perform an additional task on behalf of the user.

12. The method of claim 1, further comprising:
in response to determining the further user input is not received within the threshold duration of time:
terminating the assisted call; and
subsequent to terminating the assisted call:
causing the client device to render an additional notification that includes an indication of a result of the assisted call.

13. The method of claim 1, wherein the threshold duration of time is:
a fixed duration from when the notification that identifies the additional parameter, and that requests further user input for the information is rendered, or
a dynamic duration that is based on when a last one of one or more of the corresponding values is rendered for presentation to the additional user via the additional client device.

14. The method of claim 1, further comprising:
subsequent to initiating the assisted call:
obtaining, from the additional user associated with the entity, consent to monitor the assisted call.

15. A system comprising:
at least one processor; and
memory storing instructions that, when executed, cause the at least one processor to be operable to:
receive, from a given user via a client device associated with the given user, user input to initiate an assisted call;

determine, based on the user input:
   an entity to engage with, on behalf of the given user, during the assisted call, and
   a task to be performed, on behalf of the given user, during the assisted call;
determine, for one or more candidate parameters stored in association with the task and/or the entity, and based at least in part on a dialog with the given user, one or more corresponding values to be used in automatically generating synthesized speech, during the assisted call, in performing the task;
initiate, using the client device associated with given user, performing of the assisted call;
determine, during the performing of the assisted call and based on processing audio data, of the assisted call, that captures an utterance of an additional user associated with the entity, that a particular value, associated with an additional parameter and which was not previously determined during the dialog with the given user, is requested by the additional user; and
in response to determining that the particular value associated with the additional parameter is requested:
   causing the client device to render, outside of the assisted call, a notification that identifies the additional parameter, and that requests further user input for the particular value;
   prior to receiving any further input that is responsive to the notification, continue the assisted call, wherein, in continuing the assisted call, the at least one processor is operable to render one or more instances of synthesized speech, as part of the assistant call and for presentation to the additional user, that are based on one or more of the corresponding values for the candidate parameters that were previously determined during the dialog with the given user but have not yet been provided to the additional user during the assisted call;
   determine, during continuing the assisted call, whether further user input, that is responsive to the notification and that identifies the particular value for the additional parameter, is received within a threshold duration of time; and
   in response to determining the further user input is received within the threshold duration of time:
      render further synthesized speech, as part of the assisted call, that is based on the particular value.

16. The system of claim 15, wherein, in determining a given value, of the corresponding values, and based on the dialog with the given user, the at least one processor is operable to:
prior to initiating the assisted call:
   generate a prompt that identifies a given candidate parameter of the candidate parameters, and that requests additional information associated with the given candidate parameter;
   cause the client device to render the prompt; and
   identify, based on additional user input that is responsive to the prompt, the given value for the given candidate parameter.

17. The system of claim 15, wherein, in continuing the assisted call, the at least one processor is further operable to:
process additional audio data, of the assisted call, to determine that an additional utterance, of the additional user, includes a request for a given candidate parameter of the candidate parameters; and
in response to determining that the additional utterance includes the request for the given candidate parameter:
   cause the client device to render, on the assisted call, a given instance, of the one or more instances of synthesized speech,
      wherein the given instance includes a given value, of the corresponding values, based on the given value being determined for the given candidate parameter, and
      wherein the given instance is rendered without requesting any additional user input from the given user.

18. The system of claim 15, wherein, in continuing the assisted call, the at least one processor is further operable to:
process further audio data to determine whether a further utterance of the additional user is received within an additional threshold duration of time; and
in response to determining that no further utterance is received from the additional user within the additional threshold duration of time:
   render, during the assisted call, another instance, of the one or more instances of synthesized speech, that is based on one or more of the corresponding values that has not been requested by the additional user.

19. A non-transitory computer-readable storage medium storing instructions that, when executed, cause at least one processor to be operable to perform operations, the operations comprising:
receiving, from a given user via a client device associated with the given user, user input to initiate an assisted call;
determining, based on the user input:
   an entity to engage with, on behalf of the given user, during the assisted call, and
   a task to be performed, on behalf of the given user, during the assisted call;
determining, for one or more candidate parameters stored in association with the task and/or the entity, and based at least in part on a dialog with the given user, one or more corresponding values to be used in automatically generating synthesized speech, during the assisted call, in performing the task;
initiating, using the client device associated with given user, performing of the assisted call;
determining, during the performing of the assisted call and based on processing audio data, of the assisted call, that captures an utterance of an additional user associated with the entity, that a particular value, associated with an additional parameter and which was not previously determined during the dialog with the given user, is requested by the additional user; and
in response to determining that the particular value associated with the additional parameter is requested:
   causing the client device to render, outside of the assisted call, a notification that identifies the additional parameter, and that requests further user input for the particular value;
   prior to receiving any further input that is responsive to the notification, continuing the assisted call, wherein continuing the assisted call comprises rendering one or more instances of synthesized speech, as part of the assistant call and for presentation to the additional user, that are based on one or more of the corresponding values for the candidate parameters that were previously determined during the dialog with the given user but have not yet been provided to the additional user during the assisted call;

determining, during continuing the assisted call, whether further user input, that is responsive to the notification and that identifies the particular value for the additional parameter, is received within a threshold duration of time; and in response to determining the further user input is received within the threshold duration of time:
rendering further synthesized speech, as part of the assisted call, that is based on the particular value.

* * * * *